United States Patent
Schoon et al.

(10) Patent No.: US 11,937,530 B2
(45) Date of Patent: Mar. 26, 2024

(54) GPS LOCATION AUGMENTATION AND OUTAGE PLAYTHROUGH

(71) Applicant: Kinze Manufacturing, Inc., Williamsburg, IA (US)

(72) Inventors: Jason Schoon, Williamsburg, IA (US); Jeremy Nadke, Williamsburg, IA (US); Ryan McMahan, Williamsburg, IA (US); Matthew Moeller, Williamsburg, IA (US)

(73) Assignee: Kinze Manufacturing, Inc., Williamsburg, IA (US)

(*) Notice: Subject to any disclaimer, the term of this patent is extended or adjusted under 35 U.S.C. 154(b) by 0 days.

(21) Appl. No.: 17/302,332

(22) Filed: Apr. 30, 2021

(65) Prior Publication Data
US 2021/0341944 A1    Nov. 4, 2021

Related U.S. Application Data

(60) Provisional application No. 63/019,032, filed on May 1, 2020, provisional application No. 62/704,285, filed (Continued)

(51) Int. Cl.
*A01B 79/00* (2006.01)
*A01B 79/02* (2006.01)
(Continued)

(52) U.S. Cl.
CPC .......... *A01B 79/005* (2013.01); *A01C 21/005* (2013.01); *G01S 19/47* (2013.01);
(Continued)

(58) Field of Classification Search
CPC ..... A01B 79/005; A01B 79/02; A01C 21/005; A01C 21/00; G01S 19/47; G05D 1/0077;
(Continued)

(56) References Cited

U.S. PATENT DOCUMENTS 5,878,371 A * 3/1999 Hale .................... A01B 79/005
702/5
10,533,856 B2 * 1/2020 Bobye .................. G01C 25/005
(Continued)

FOREIGN PATENT DOCUMENTS

| CN | 107560613 B * | 3/2020 |
| WO | 2015120470 A1 | 8/2015 |
| WO | 2019084643 A1 | 5/2019 |

OTHER PUBLICATIONS

Machine Translation: CN-107560613-B (Year: 2020).*
(Continued)

*Primary Examiner* — Anne Marie Antonucci
*Assistant Examiner* — Connor L Knight
(74) *Attorney, Agent, or Firm* — McKee, Voorhees & Sease, PLC

(57) ABSTRACT

Agricultural machines utilize global positioning systems (GPS) to acquire the location of the machine as well as the location of an event, which may be based upon an operation of the agricultural machine. Because of the possibility of outage and/or inaccuracy of the GPS, a GPS augmentation system can be included with the agricultural machine. The GPS augmentation system can supplement the location determination of the GPS, or can be used in place of the GPS when the GPS is not available. An unmanned vehicle can also be used as part of the augmentation system to provide additional information for the location of the agricultural machine and/or the event.

17 Claims, 16 Drawing Sheets

Related U.S. Application Data on May 1, 2020, provisional application No. 62/704,284, filed on May 1, 2020, provisional application No. 63/018,833, filed on May 1, 2020.

(51) Int. Cl.

| | | |
|---|---|---|
| *A01C 21/00* | (2006.01) | |
| *G01S 19/47* | (2010.01) | |
| *G05D 1/00* | (2006.01) | |
| *G05D 1/02* | (2020.01) | |
| *G05D 1/10* | (2006.01) | |
| *G06F 3/06* | (2006.01) | |
| *G06F 16/16* | (2019.01) | |
| *G06F 16/174* | (2019.01) | |
| *G06F 16/176* | (2019.01) | |
| *H04W 76/14* | (2018.01) | |

(52) U.S. Cl.
CPC ......... *G05D 1/0077* (2013.01); *G05D 1/0219* (2013.01); *G05D 1/0231* (2013.01); *G05D 1/027* (2013.01); *G05D 1/0278* (2013.01); *G05D 1/0287* (2013.01); *G05D 1/101* (2013.01); *G06F 3/0641* (2013.01); *G06F 3/0643* (2013.01); *G06F 16/168* (2019.01); *G06F 16/1744* (2019.01); *G06F 16/1748* (2019.01); *G06F 16/176* (2019.01); *H04W 76/14* (2018.02); *A01B 79/02* (2013.01); *G05D 2201/0201* (2013.01)

(58) Field of Classification Search
CPC .... G05D 1/0219; G05D 1/0231; G05D 1/027; G05D 1/0278; G05D 1/0287; G05D 1/101; G05D 2201/0201; G06F 3/0641; G06F 3/0643; G06F 16/168; G06F 16/1744; G06F 16/1748; G06F 16/176; H04W 76/14
See application file for complete search history.

(56) References Cited

U.S. PATENT DOCUMENTS

| | | | |
|---|---|---|---|
| 10,795,351 B2 | 10/2020 | Hurd | |
| 10,820,508 B2 * | 11/2020 | Dix | A01D 57/22 |
| 2002/0105460 A1 * | 8/2002 | Sladen | G01C 21/28 |
| | | | 342/357.32 |
| 2010/0094481 A1 | 4/2010 | Anderson | |
| 2010/0332835 A1 | 12/2010 | Lim | |
| 2011/0284252 A1 | 11/2011 | Friggstad et al. | |
| 2012/0163603 A1 | 6/2012 | Abe et al. | |
| 2012/0271489 A1 | 10/2012 | Roberts et al. | |
| 2013/0066666 A1 * | 3/2013 | Anderson, Jr. | G06Q 10/06 |
| | | | 705/7.12 |
| 2013/0191017 A1 * | 7/2013 | Peake | G01C 21/34 |
| | | | 701/410 |
| 2014/0303854 A1 | 10/2014 | Zielke | |
| 2015/0039220 A1 * | 2/2015 | Georgy | G01S 19/47 |
| | | | 701/400 |
| 2015/0373904 A1 | 12/2015 | Hahn et al. | |
| 2016/0366815 A1 * | 12/2016 | Guyette | G01C 21/165 |
| 2017/0146990 A1 * | 5/2017 | Wang | B64C 39/024 |
| 2017/0185086 A1 | 6/2017 | Sauder et al. | |
| 2017/0238460 A1 | 8/2017 | MacKean et al. | |
| 2017/0315555 A1 | 11/2017 | Sugumaran et al. | |
| 2017/0350721 A1 * | 12/2017 | Ren | A01B 79/005 |
| 2019/0343035 A1 | 11/2019 | Smith et al. | |
| 2019/0357426 A1 | 11/2019 | Wolff et al. | |
| 2020/0000006 A1 | 1/2020 | McDonald et al. | |
| 2020/0008347 A1 | 1/2020 | Koch et al. | |
| 2020/0019159 A1 | 1/2020 | Kocer et al. | |
| 2020/0103910 A1 * | 4/2020 | Sauder | A01C 21/005 |
| 2020/0110403 A1 | 4/2020 | Antich | |
| 2020/0110423 A1 | 4/2020 | Antich | |
| 2020/0178049 A1 | 6/2020 | Suleman et al. | |
| 2020/0228316 A1 | 7/2020 | Cahill | |
| 2021/0011471 A1 | 1/2021 | Hurd | |
| 2021/0144911 A1 * | 5/2021 | Plattner | A01M 7/0089 |

OTHER PUBLICATIONS

International Searching Authority in connection with PCT/US2021/030091 filed Apr. 30, 2021, "The International Search Report and the Written Opinion of the International Searching Authority, or the Declaration", 12 pages, dated Aug. 11, 2021.

* cited by examiner

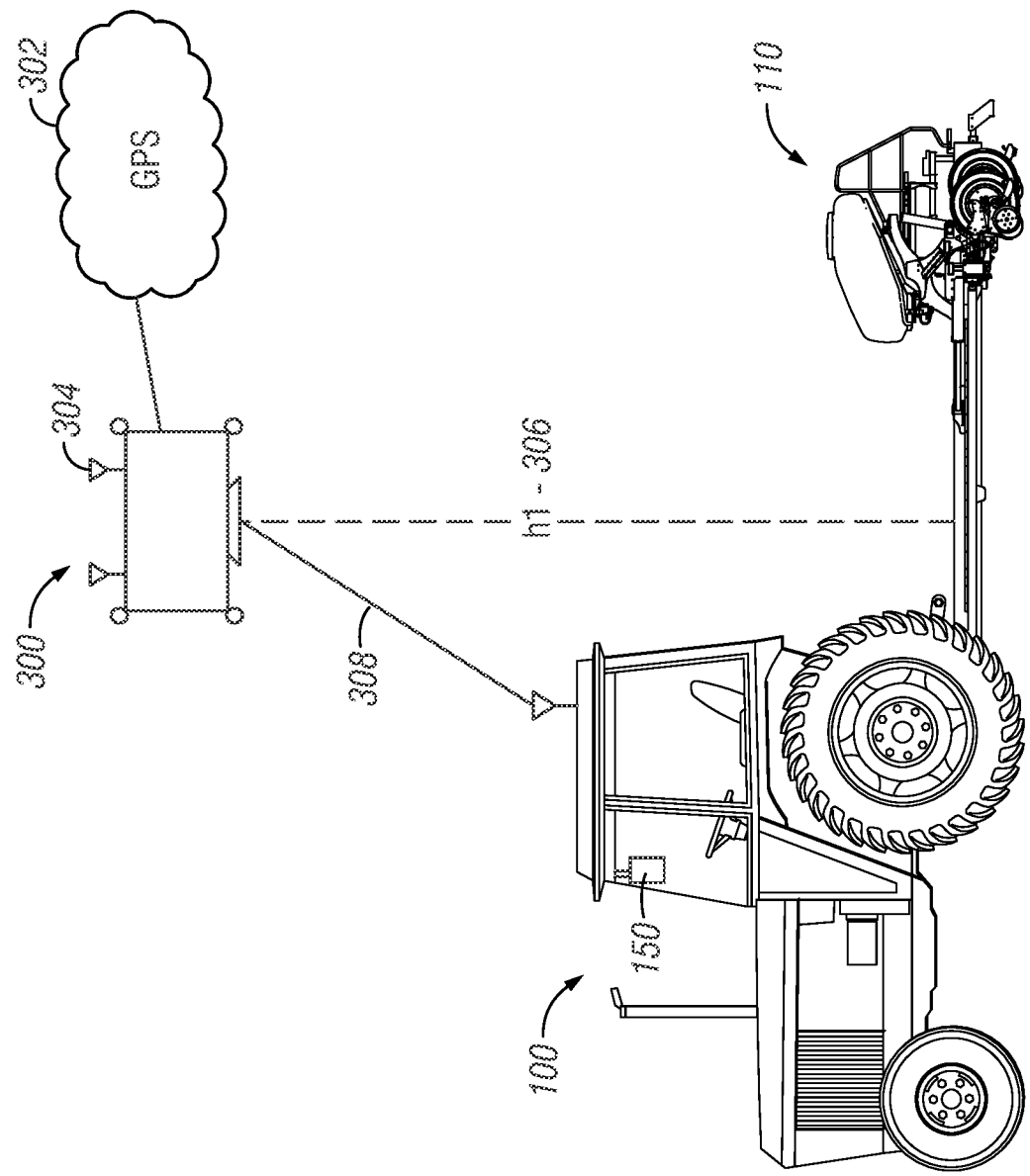

GPS LOCATION AUGMENTATION AND OUTAGE PLAYTHROUGH

CROSS REFERENCE TO RELATED APPLICATIONS

This application claims priority under 35 U.S.C. § 119 to provisional patent applications U.S. Serial Nos. 62/704,284, 62/704,285, 63/018,833, 63/019,032, all of which were filed May 1, 2020. The provisional patent applications are herein incorporated by reference in their entireties, including without limitation, the specification, claims, and abstract, as well as any figures, tables, appendices, or drawings thereof.

FIELD OF THE INVENTION

Aspects of the invention relate generally to an apparatus, systems, and corresponding method of use in at least the agricultural industry. More particularly, but not exclusively, apparatus, methods, and systems include augmenting, supplementing, and/or replacing GPS information for use in agricultural operations.

BACKGROUND

An agricultural row crop planter is a machine built for precisely distributing seed into the ground. The row crop planter generally includes a horizontal toolbar fixed to a hitch assembly for towing behind a tractor or other implement. Row units including seed meters are mounted to the toolbar. In different configurations, seed may be stored at individual hoppers on each row unit, or it may be maintained in a central hopper and delivered to the row units on an as needed basis. The row units include ground-working tools for opening and closing a seed furrow, and a seed metering system for distributing seed to the seed furrow.

Precision farming relies on very accurate and timely knowledge of physical location. Yields can be directly attributed to how precise spacing of seed can be performed. Conventional GPS to-date has limitations in accuracy that need to be augmented from other sources. Additionally, due to obstructions, atmospheric events, or other impacts outages in receiving GPS data present a challenge to farming operations. Such limitations in GPS, including potential outages, can affect a current farming operation for a single implement, and can also affect multiple implements in common or separate locations that rely on the information provided by GPS. This lack of information can result in compaction issues, overplanting, missed planting, and other issues that could affect the yield of a crop.

Thus, there exists a need in the art for systems, methods, and/or apparatus that improve on the use of GPS in agricultural operations, including the augmentation of GPS data and the replacement of GPS during an outage.

SUMMARY

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

Therefore, it is a primary object, feature, and/or advantage of any of the aspects of any of the presently disclosed embodiments to improve on or overcome the deficiencies in the art.

It is another object, feature, and/or advantage of any of the aspects of any of the presently disclosed embodiments to augment location detecting systems, methods, and/or apparatus associated with agricultural implements.

It is still another object, feature, and/or advantage of any of the aspects of any of the presently disclosed embodiments to augment the Global Positioning System (GPS) of a tow vehicle and/or towed implement.

It is yet another object, feature, and/or advantage of any of the aspects of any of the presently disclosed embodiments to provide a system and/or method to provide location or positioning information for a tow vehicle and/or towed agricultural implement when a GPS outage or disruption has occurred.

It is a further object, feature, and/or advantage of any of the aspects of any of the presently disclosed embodiments to provide absolute positioning for a tow vehicle and towed agricultural implement using a combination of GPS and an inertial measurement unit (IMU).

It is yet a further object, feature, and/or advantage of any of the aspects of any of the presently disclosed embodiments to utilize the location/positioning information from an IMU and other information to replace the information provided by GPS during an outage or disruption.

It is still a further object, feature, and/or advantage of any of the aspects of any of the presently disclosed embodiments to share the positioning of a combination of tow vehicle and towed agricultural implement with a second location or tow vehicle and towed agricultural implement.

It is yet a further object, feature, and/or advantage of any of the aspects of any of the presently disclosed embodiments to include one or more unmanned autonomous vehicles (UV) to augment the location of a tow vehicle and towed agricultural implement.

It is still an object, feature, and/or advantage of any of the aspects of any of the presently disclosed embodiments to store and access agricultural data at a location remote of the agricultural implement, such as in a cloud-based storage system.

The computerized methods and systems disclosed herein can be used in a wide variety of agricultural operations, including planting, tilling, baling, harvesting, spraying, transporting, cultivating, harrowing, plowing, fertilizing, broadcasting, loading, unloading, and the like. Some aspects of the computerized methods and systems disclosed herein may even have use in other industries which rely heavily on communications and/or navigation, such as the automotive, nautical, and/or aerospace industries.

It is still yet a further object, feature, and/or advantage to support internet of things (IoT) and other environments in which information, data, or the like is transmitted efficiently with higher speed and higher bandwidth.

It is still yet a further object, feature, and/or advantage to provide safe, cost effective, and reliable outcomes for farmers using the computerized methods disclosed herein.

It is still yet a further object, feature, and/or advantage to display aspects of the computerized methods disclosed herein with distinct aesthetic features, including, but not limited to, maps, tables, and other text or images which otherwise enhance interfacing with electronics of the agricultural implement. For example, the user experience can be enhanced or otherwise further facilitated by means of a graphical user interface which presents the user with intuitive controls and/or automatically alerts an operator of the agricultural implement to potential problems and/or to prompt the operator for manual input, such as where potential problems cannot be resolved automatically. By way of another example, graphical user interfaces can be tailored to intuitively, such as by comparison, and simultaneously, such as in a compact space, show more than one data set.

According to some aspects of the present disclosure, an agricultural system includes an agricultural implement configured to perform at least one agricultural operation in an area, a global positioning system (GPS) associated with the agricultural implement to provide location information for the at least one agricultural operation in the area, wherein the location information relates to an event of the at least one agricultural operation, and a GPS augmentation system associated with the agricultural implement, wherein the GPS augmentation system supplements the GPS or replaces the GPS during an outage of the GPS.

According to any aspects of any of the embodiments disclosed, the GPS augmentation system comprises a plurality of GPS augmenting devices.

According to any aspects of any of the embodiments disclosed, the plurality of GPS augmenting devices comprise one or more sensors, LIDAR, radar, speedometers, direction devices, inertial measurement units, cameras, accelerometers, gyroscopes, magnetometers, other known types of position sensors, error calculation devices (e.g., devices for calculating clock drift, *ephemera*, and/or ionospheric delay), and/or any other suitable/beneficial radionavigation components.

According to any aspects of any of the embodiments disclosed, the GPS augmentation system comprises an inertial measurement unit.

According to any aspects of any of the embodiments disclosed, an unmanned vehicle (UV) is associated with the agricultural implement.

According to any aspects of any of the embodiments disclosed, the UV is part of the GPS augmentation system.

According to any aspects of any of the embodiments disclosed, the UV comprises an unmanned aerial vehicle (UAV).

According to any aspects of any of the embodiments disclosed, the at least one agricultural operation comprises one or more of planting, tilling, baling, harvesting, spraying, transporting, and cultivating.

According to any aspects of any of the embodiments disclosed, the event of the at least one agricultural operation comprises one or more of planting a seed, spraying a location, harvesting a crop, driving at a location, and placement of a bale.

According to any aspects of any of the embodiments disclosed, a communication system is included for communicating information with another agricultural implement.

According to any aspects of any of the embodiments disclosed, a processor is associated with the agricultural implement.

According to any aspects of any of the embodiments disclosed, the processor instructs an operation or non-operation of the at least one agricultural operation.

According to any aspects of any of the embodiments disclosed, a processor is in communication with the GPS and the GPS augmentation system, wherein the processor can: utilize information from both the GPS and the GPS augmentation system to provide augmented location; or utilize information from the GPS augmentation system when the GPS is not available to continue providing location information.

According to any aspects of any of the embodiments disclosed, the system includes a display showing at least one of GPS location information, combined GPS and GPS augmentation system location information, and GPS augmentation system location information.

According to additional aspects and/or embodiments, a method of acquiring the location of an event of an agricultural operation performed by an agricultural machine includes acquiring location information with GPS, acquiring location information with a GPS augmentation system, and using the location informations by utilizing the location information from both the GPS and the GPS augmentation system to provide the location of the event, or utilizing the location information from the GPS augmentation system when the GPS is not available to provide the location of the event.

According to any aspects of any of the embodiments disclosed, the method includes displaying the location of the event on a user display.

According to any aspects of any of the embodiments disclosed, when the GPS is not available, displaying the location of the event based upon the GPS augmentation system differently than the displayed location utilizing both the GPS and the GPS augmentation system.

According to any aspects of any of the embodiments disclosed, the method includes storing the location of the event in a memory with a date and time.

According to any aspects of any of the embodiments disclosed, the method includes connecting an unmanned vehicle to the agricultural machine to aid in acquiring the location of the event.

According to any aspects of any of the embodiments disclosed, the unmanned vehicle comprises an unmanned aerial vehicle.

According to any aspects of any of the embodiments disclosed, the method includes sharing the location of the event with a second agricultural machine.

According to any aspects of any of the embodiments disclosed, a controller of the second agricultural machine uses the location of the event to control an operation of the second agricultural machine.

According to additional aspects and/or embodiments, a system for location determination of an agricultural event performed by an agricultural machine including a global positioning system (GPS), and a GPS augmentation system, wherein the GPS augmentation system comprises an unmanned aerial vehicle (UAV) in communication with the agricultural machine, said UAV communicating its position to the agricultural machine to supplement the location determined by the GPS, or be used in place of the GPS when the GPS is not available.

These and/or other objects, features, advantages, aspects, and/or embodiments will become apparent to those skilled in the art after reviewing the following brief and detailed descriptions of the drawings.

BRIEF DESCRIPTION OF THE DRAWINGS

FIG. 10A is a view of a UAV used in operation with an agricultural machine to aid in location determination.

Figure 1:
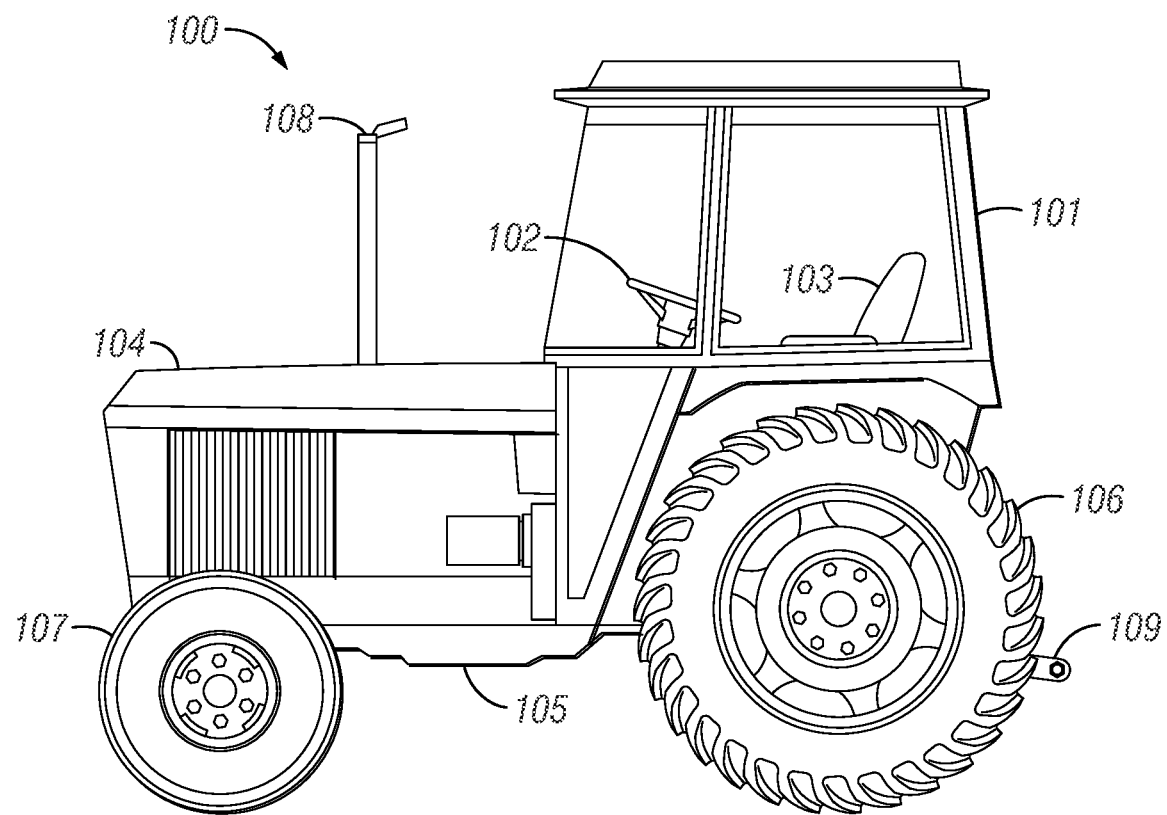
FIG. 1 is a side elevation view of an exemplary tractor.

Several aspects are illustrated and described in detail, wherein like reference characters represent like components throughout the several views. The drawings are presented for exemplary purposes and may not be to scale unless otherwise indicated. In addition, it is to be noted that any of the aspects of any of the figures can be utilized with any other figure not including said aspect and still retain the spirit of the invention.

DETAILED DESCRIPTION

The following definitions and introductory matters are provided to facilitate an understanding of the embodiments and/or aspects thereof. Unless defined otherwise, all technical and scientific terms used herein have the same meaning as commonly understood by one of ordinary skill in the art to which embodiments of the invention pertain.

The terms "a," "an," and "the" include both singular and plural referents.

The term "or" is synonymous with "and/or" and means any one member or combination of members of a particular list.

The terms "invention" or "present invention" as used herein are not intended to refer to any single embodiment of the particular invention but encompass all possible embodiments as described in the specification and the claims.

The term "about" as used herein refers to slight variations in numerical quantities with respect to any quantifiable variable. One of ordinary skill in the art will recognize inadvertent error can occur, for example, through use of typical measuring techniques or equipment or from differences in the manufacture, source, or purity of components. The claims include equivalents to the quantities whether or not modified by the term "about."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are referenced according to the views presented. Unless context indicates otherwise, these terms are not limiting.

In communications and computing, a computer readable medium is a medium capable of storing data in a format readable by a mechanical device. The term "non-transitory" is used herein to refer to computer readable media ("CRM") that store data for short periods or in the presence of power such as a memory device.

Generally, the non-transitory computer readable medium operates under control of an operating system stored in the memory. The non-transitory computer readable medium implements a compiler which allows a software application written in a programming language such as COBOL, C++, FORTRAN, or any other known programming language to be translated into code readable by the central processing unit. After completion, the central processing unit accesses and manipulates data stored in the memory of the non-transitory computer readable medium using the relationships and logic dictated by the software application and generated using the compiler.

In one embodiment, the software application and the compiler are tangibly embodied in the computer-readable medium. When the instructions are read and executed by the non-transitory computer readable medium, the non-transitory computer readable medium performs the steps necessary to implement and/or use the present invention. A software application, operating instructions, and/or firmware (semi-permanent software programmed into read-only memory) may also be tangibly embodied in the memory and/or data communication devices, thereby making the software application a product or article of manufacture according to the present invention.

One or more embodiments described herein can be implemented using programmatic modules, engines, or components. A programmatic module, engine, or component can include a program, a sub-routine, a portion of a program, or a software component or a hardware component capable of performing one or more stated tasks or functions. A module or component can exist on a hardware component independently of other modules or components. Alternatively, a module or component can be a shared element or process of other modules, programs, or machines.

Mechanical, electrical, chemical, procedural, and/or other changes apparent to one of ordinary skill in the art can be made without departing from the spirit and scope of the invention.

FIG. 1 shows a tractor 100 used to deliver high torque, for the purposes of hauling machinery used in agriculture. The tractor 100 includes a cab 101 with a steering wheel 102 and a seat 103 for an operator. The tractor 100 also includes a vehicle frame 104 which houses an engine located near the front axle of the tractor 100 and in front of the cab 101. The cab 101 and vehicle frame 104 are supported, structurally, by the tractor's chassis 105, which attaches to rear drivable wheels 106 and front steerable wheels 107, said front steerable wheels 107 operationally connected to the steering wheel 102. An exhaust pipe 108 allows carbon monoxide to exit the tractor 100 during operation of the engine. A tractor hitch 109 allows for connection between agricultural machinery and the tractor 100.

Figure 2:
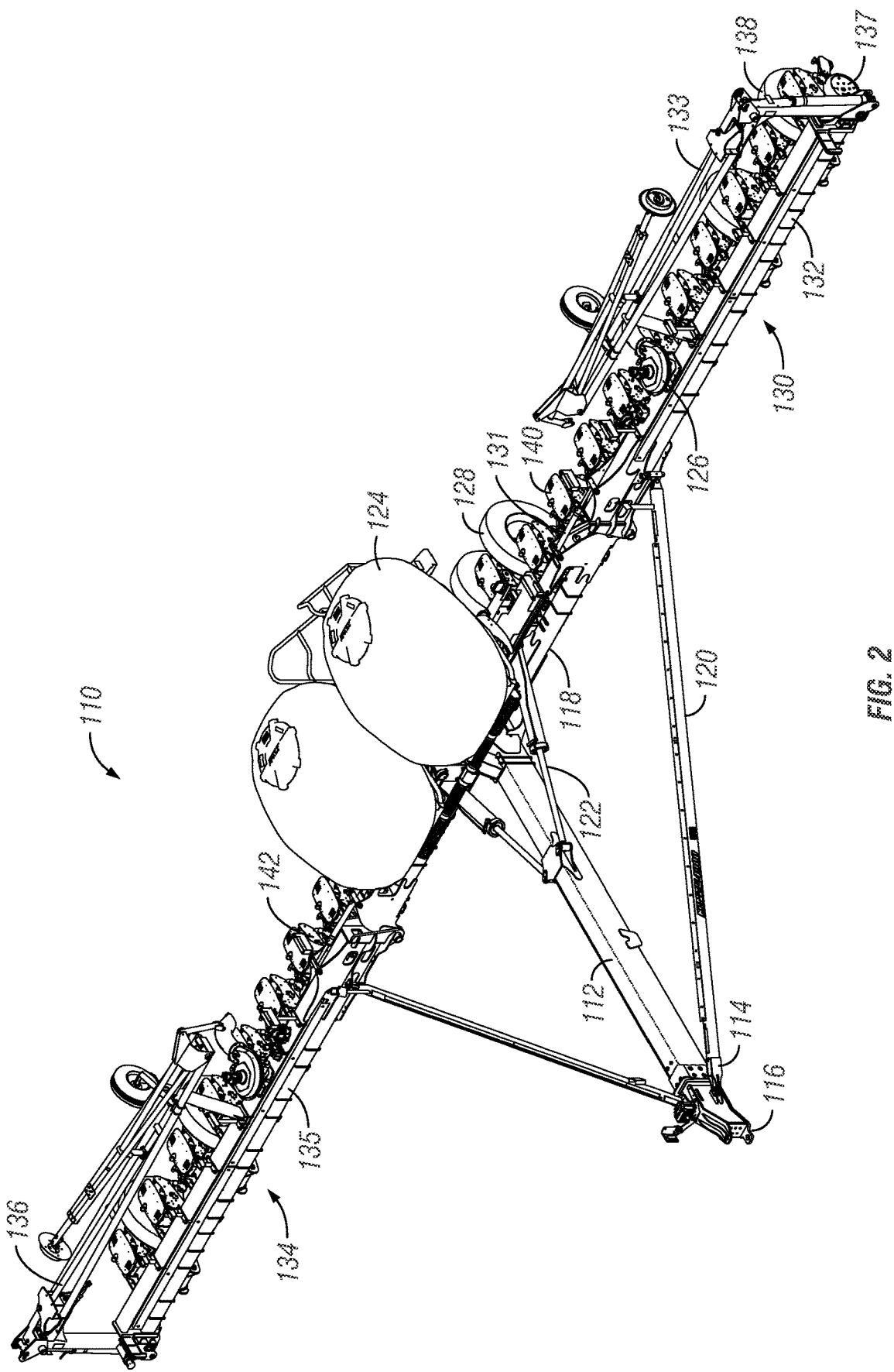
FIG. 2 is a perspective view of an agricultural planter.

FIG. 2 shows a planter 110 used to plant and fertilize seed in a controlled manner. For example, the planter 110 as shown in FIG. 2 includes a tongue 112, which may be telescoping. The tongue 112 includes a first end 114 with an implement hitch 116 for attaching to a tow vehicle, such as the tractor 100. The opposite end of the tongue 112 is attached to a frame or central toolbar 118. Draft links 120 are connected between the central toolbar 118 and the tongue 112 and are used in conjunction with folding actuators 122 to fold the central toolbar 118 in a frontward manner. Therefore, the tongue 112 maybe a telescoping tongue in that it can extend or track to allow for the front folding of the central toolbar 118. The planter 110 may also be a lift and rotate, rear fold, vertical fold, narrow row, or generally any other type of planter.

The central toolbar 118 includes first and second wings 130, 134 extending therefrom. The central toolbar 118 includes central hoppers 124 which contain seed or other granules/particulate used with planting. A plurality of transport wheels 128 also are connected to the central toolbar 118. The first and second wings 130, 134 are generally mere images of one another. The wings include first and second wing toolbars 132, 135. Attached along the central toolbar 118 as well as the first and second wing toolbar 132, 135, are a plurality of row units 140. The row units include seed meters 142, ground engaging tools, and/or other components used for planting, tilling, and fertilizing seed in a controlled manner. Also connected to the first and second wings 130, 134 are first and second markers 133, 136. The markers include actuators 137 which are used to raise and lower the markers 133, 136. The markers 133, 136 can be lowered to provide guidance for the edge of a planter for use in planting. When not required, the markers can be lifted to a position as that shown in FIG. 2 to move the markers out of the way.

Also shown in FIG. 2 are a plurality of fans 126 as well as a plurality of wheels 138. The wings may also include actuators 131 to raise and lower or otherwise provide a downward force on the wings. Therefore, as is shown in FIG. 2, there are a multiplicity of components of the planting implement 110. The components may include moving parts, such as the actuators used to move the wings, markers, row units, etc., while also providing additional functions. For example, the fans 126 are used to provide a pressure in the seed meters 142 to aid in adhering seed to a seed disk moving therein. The seed meters may be electrically driven in that a motor, such as a stepper motor, can be used to rotate the seed meters to aid in adhering seed thereto and to provide for dispensing of the seed in a controlled manner for ideal spacing, population, and/or placement. Other features may include actuators or other mechanisms for providing down force to the row units 140. Lights may also be included as part of the planter.

Additionally, an air seed delivery system may be provided between the central hoppers 124 and any plurality of seed meters 142 on the row units 140 in that the air seed delivery system provides a continued flow of seed to the row units on an as needed manner to allow for the continuous planting of the seed via the seed meters on the row units. Thus, the various controls of the planter may require or otherwise be aided by the use of an implement control system. The implement control system can aid in controlling each of the functions of the implement or planter 110 so as to allow for the seamless or near seamless operation with the implement, and also provides for the communication and/or transmission of data, status, and other information between the components.

As will be appreciated, the planter need not include all of the features disclosed herein and may also include additional or alternative features as those shown and/or described. The foregoing has been included as an exemplary planter, and it should be appreciated that generally any planter from any manufacturer and any add-ons or aftermarket components may be included in any planter that encompasses any of the aspects of the invention.

Therefore, a planter 110 such as that shown, can be pulled by the tow vehicle, such as the tractor 100 of FIG. 1. In addition, the planter 110 could be pulled by a self-propelled, autonomous tug unit, rather than an operator-driven vehicle, such as the tractor, such as the one shown and described in co-owned U.S. Pat. No. 10,575,453, which is herein incorporated by reference in its entirety. The rear drivable wheels and front steerable wheels can be substituted for tracks, regardless of whether said tracks are implemented on an operator-driven vehicle or a self-propelled vehicle.

The amount of information being transmitted between the tractor and the components of the planter are ever growing and includes high traffic. Currently, any transmission of the information is done with low bandwidth, poorly defined protocol, and also includes compatibility issues among the various components of the tractor and/or implements. Therefore, issues have emerged, and new type have developed for a system including a high traffic mix, low latency, high security, high reliability, high throughput, common supply chain, and highly rugged system to allow for the operation of the implement and to aid in controlling the various components on or associated with the implement. Therefore, as well be understood, the present disclosure provides for solutions to meet said emerging requirements, which can include ruggedization and/or input/output (I/O) complements. The solution has been developed with standard protocols and components with adjacent opportunities in mind. The result becomes an intelligent internet of things based solution supporting a unique complement of functions and input/output features.

Figure 3:
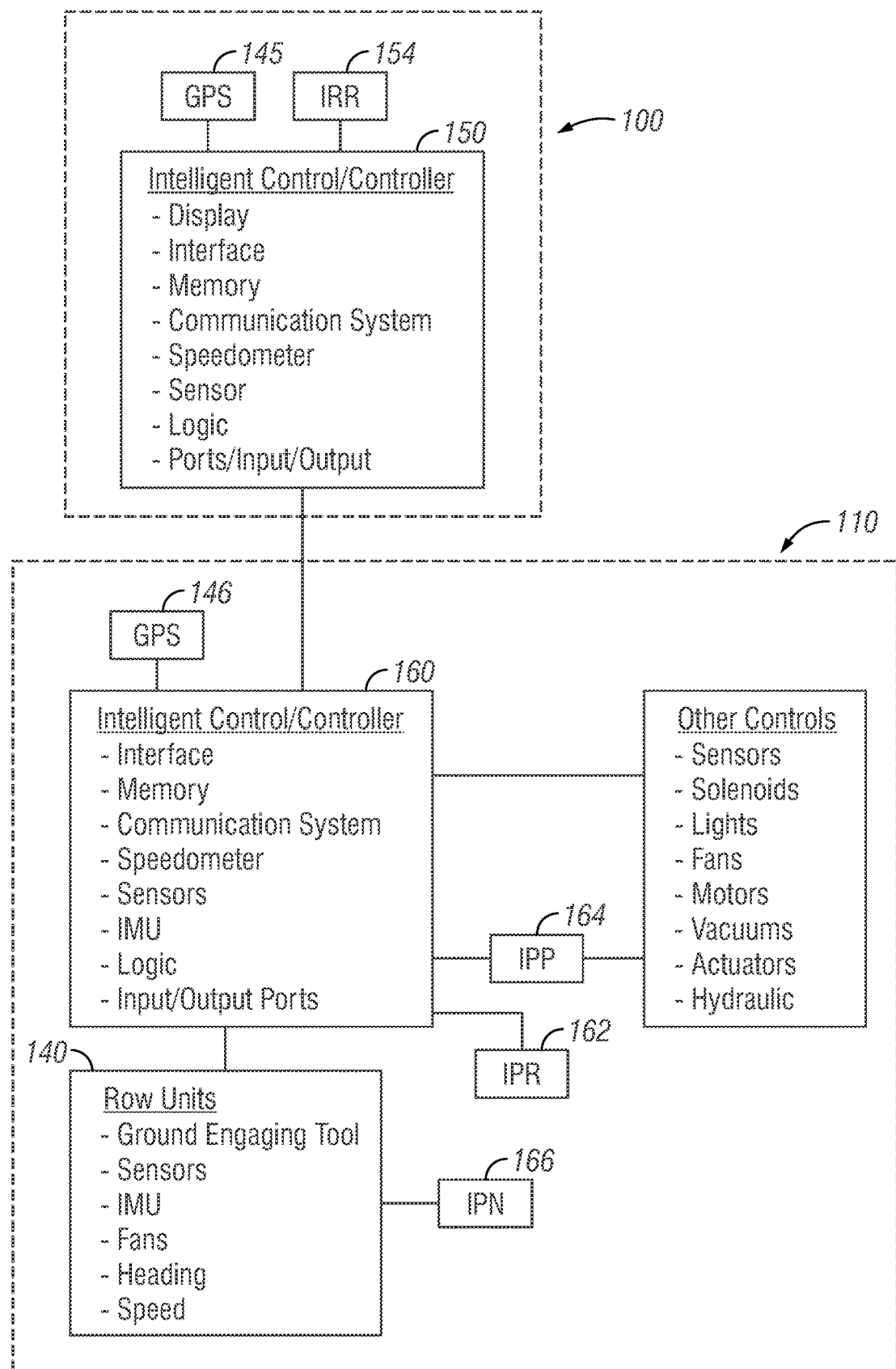
FIG. 3 is a schematic of an agricultural machine comprising a tow vehicle and a connected implement.

Therefore, FIG. 3 discloses an implement control system and components according to aspects of the present disclosure. As is shown in the figure, some components of the implement control system may be included not on the implement itself. For example, the implement control system as shown in the figure includes an intelligent control 150, which, for example, can employ a touch-screen display or other machine-user interface. Examples of such intelligent controls 150 may be, but are not limited to, tablets, telephones, handheld devices, laptops, user displays, computers, or other computing devices capable of allowing input, providing options, and showing output of electronic functions. Still further, the control 150 may include additional components, such as a microprocessor, a microcontroller, another suitable programmable device, other components implemented partially or entirely on a semiconductor (e.g., a field-programmable gate array ("FPGA") chip, such as a chip developed through a register transfer level ("RTL") design process). Still additionally, the control 150 may include a number of inputs, outputs, memory, power, speakers, microphones, cameras, sensors, and the like.

The intelligent control 150 may be attached to or otherwise associated with an intelligent router unit 154. The intelligent router unit 154 can be included, but is not required in all instances. For example, when the intelligent control 150 is a tablet, the intelligent control 150 may not include the desired number of connections, inputs, and/or output capabilities. Therefore, the intelligent router 154 can be included to connect to the intelligent control 150 to provide additional inputs, outputs, and/or other connectivity to the intelligent control 150. The intelligent control 150 and/or intelligent router 154 can be remote of an implement, such as a planter 110. As shown in FIG. 3, the combination of the intelligent control 150 and intelligent router 154 are shown to be in the tractor 100 or other tow vehicle. When the intelligent control 150 is a tablet, the member can be positioned within the cab of a tractor to allow for the input and output to be shown on a display therein, such that an operator can view and interact with said display while in the tractor 100. However, it is to be appreciated that the control unit can be used generally anywhere remote of the planting implement, and can even be remote of the location or locality of the field.

As mentioned, the intelligent control can take the form of a display or a component of a display. The display is a form of a user interface. A user interface is how the user interacts with a machine. The user interface can be a digital interface, a command-line interface, a graphical user interface ("GUI") or any other way a user can interact with a machine. For example, the user interface ("UI") can include a combination of digital and analog input and/or output devices or any other type of UI input/output device required to achieve a desired level of control and monitoring for a device. Examples of input and/or output devices include computer mice, keyboards, touchscreens, knobs, dials, switches, buttons, etc. Input(s) received from the UI can then be sent to a microcontroller to control operational aspects of a device.

The user interface module can include a display, which can act as an input and/or output device. Such a display can be, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, or a reflective bistable cholesteric display (i.e., e-paper).

The intelligent control/display 150 in the tractor provides numerous amounts of information. Exemplary pieces of information may include, but is not to be limited to, historical information (path planning, yields, planting locations, etc.), communication/network systems (Bluetooth, wired or wireless connections, near field communications, WAN, LAN, cellular networks, etc.), speedometer information, directional information (9-axis information), sensors, programmable logic, input/outputs, and the like. The information may be for the tractor, the planter, or a combination. The information may also include information from additional tractors and/or planters or other implements, in a common field or a separate field.

Still additional components that may be associated with, on, or otherwise with the tow vehicle/tractor 100 include a global positioning system ("GPS"). The GPS may be separate from or part of the display 150, and is used to provide location information for the tractor 100.

FIG. 3 also shows components of the system that may be part of the implement, such as the planter 110. It should also be appreciated that the implement can be generally any type of agricultural implement, including, but not limited to planters, seeders, tillage equipment, sprayers, discs, applicators, or the like. As shown, the planter/implement 110 may include GPS 146, which may be taken from the tractor 100 or may be a separate source/indicator for the location of the planter separate from the tractor. This may be in the form of an antenna or other receiver for communicating with a GPS source, such as a satellite or tower to transmit locational information.

Row units 140, which may number from one to N, where N can be any number greater than one, are associated with the planter 110. The row units for a planter include components to aid in precision placement of a seed in a field, such as based upon the location determined by the GPS. The row units therefore include numerous components, such as including, but not limited to, ground engaging tools, sensors, actuators, sensors, inertial measurement units, and the like. The row units 140 and/or other components of the planter 110 may also include numerous other controls and sensors. The controls and/or sensors may be controlled or otherwise associated with a router, node, intelligent control, sensors, or the like.

For example, the planter may include one or more of an intelligent planter router ("IPR") 162, intelligent planter node ("IPN") 166, and intelligent planter positioner ("IPP") 164. The IPR 162 can also be referred to as a planter personality module and is a type of intelligent implement router or intelligent router member. The IPR 162, as will be disclosed herein, provides for programmability to the planter, while also providing for connectivity to components and controls for various aspects of the planter. For example, the IPR 162 can include an intelligent control feature or member (central processing unit or the like) which can be programmed to provide information related to the planter 110. This can include the number of rows on a planter, type of planter, type of pressure for the seed meters, type of seed meters, number of seed meters, and generally any other information associated with the planter such that the information may be utilized to operate the functionality of the planter. Such programming of the IPR 162 can be done during manufacture of the planter, such as building thereof. Therefore, the IPR 162 can be programmed on an as-built basis to provide such information that can be transmitted with the other components of the implement control system. However, the configuration of the IPR 162 will provide information embedded in the CPU thereof during manufacture to provide options and settings for interaction with the other components of the implement control system. The IPR 162 can be connected to a plurality of intelligent planter nodes 166 which may be generically referred to as intelligent nodes or otherwise intelligent implement nodes.

The IPNs 166 can be used both for at the row units of a planter and/or for auxiliary functions of the planter. The IPN 166 can be positioned at each row unit of the planter, or can be increased such that there are multiple IPNs at each row unit, such that an IPN can be broken down by IPN row one, IPN row two all the way and up to IPN row N, wherein it is equal to the number of row units associated with the planter. Likewise, when the IPN 166 is used with an auxiliary function of the planter, the number of IPN's associated with the planter can be determined based on the number of auxiliary functions associated with the planter itself.

The IPPs 164 can be generically referred to as intelligent positioning members or intelligent implement positioning members. The IPP 164, as will be disclosed herein can be utilized with each of the nodes or with any number of functions or components of the planter 110 to provide for additional information associated with the components. This can include the movement, location, or other data that can be collected via the IPP 160 that can be utilized and transmitted to the various components of the implement control system, such as the user display of the intelligent control 150.

The IPN, IPR, and IPP are shown and described in co-owned U.S. Pat. No. 10,952,365, which is hereby incorporated by reference in its entirety. As shown in U.S. Pat. No. 10,952,365 application, the IPN, IPR, and IPP have numerous functions and work with numerous components. As shown in the application, there is an intelligent control in the form of a display/CPU member. The display/CPU member is connected to an IPR. An Ethernet connection can be utilized to connect the display to the implement IPR. The use of Ethernet connection allows for high speed, high band width transmission of information between the components. Ethernet protocol allows for high speed, high speed bandwidth wherein a large amount of data can be transmitted between two components connected via the Ethernet connection in a manner that has not to date been realized in the agricultural industry. Therefore, the use of the Ethernet in the implement control system provides for a much greater transmission in communication of data in a high-speed manner. The IPR is shown to have three Ethernet connections extending therefrom. These include an Ethernet left, and Ethernet right, and Ethernet auxiliary. The Ethernet left connections is showing the Ethernet connection to the left wing of a planter 110, and is shown to be connected to a number of IPNs which are associated with the row units attached to and or on the left wing of the planter. Similarly, the Ethernet right connection is connected to a plurality of IPNs that are associated with a number of row units attached or associated with a right wing of the planter 110. However, it should be appreciated that the number of IPNs utilized and the delegation of the right and left are for exemplary purposes only, and are should not be limiting to the present disclosure. Finally, the Ethernet auxiliary connection is connecting the IPR to a plurality of IPNs associated with auxiliary functions of the planter 110. While two IPNs are connected via the Ethernet auxiliary, it is to be appreciated that this is for exemplary purposes only, and is not to be limiting on the present disclosure either.

Therefore, for exemplary purposes, the Ethernet left connection associated with the IPNs can be described as follows. The IPNs are connected to a number of sensors, motors, and other controls in which the IPNs transmit information between each other and the IPR in order to control functions of the components thereon. For example, one IPN is connected to a seed meter motor, insecticide flow center, seed sensor, manual run button, insecticide motor control, and liquid fertilizer sensor. Such motor and sensors are generally associated with a row unit and/or seed meter of a planter. Therefore, the IPN is connected to the components and operates with the IPR in order to control the functionality of the various components. A different IPN connected to the Ethernet left connection includes connection to vacuum solenoids, work lights, vacuum sensors, work switches, and pneumatic down pressure (PDP). Likewise, a different IPN connected to the Ethernet right connection includes connection to vacuum solenoids, work lights, vacuum sensors, work switches, and marker solenoids. These are also functions associated with the wing and control of components thereon. Therefore, the additional IPN will include connections and control of the functions associated with these components. The Ethernet auxiliary connection is shown to be connected to additional components. For example, the IPNs associated with the Ethernet auxiliary connection include components of wing wheel solenoids, axle solenoids, wing solenoids, field coils, alternator sensors, temperature sensors, air seed delivery controls, hitch solenoids, jump start controls and fertilizer controls. Such controls, sensors, and the like are associated with other aspects of the planter and control thereof. This allows for the use of the planter and the acquisition of data associated with the varying controls.

Therefore, the IPNs are in communication with the IPR to provide the controls for the associated components of the IPNs. This will allow for the control of the planter in a higher speed and higher bandwidth manner, such that the controls will be passing a higher amount of data between the IPNs and the IPR. Furthermore, the use of the implement control system as shown and described will provide additional benefits and improvements. Such benefits may include a type of plug-n-play system. Currently, each row unit includes a node or control board that is specifically programmed for the location of the row unit in relation to the planter, type of seed meter used with the planter and other factors in which the node is specifically tailored to and tied down to a specific location. Aspects of the present disclosure allow for the IPNs to be near universal and function to allow for the IPN to be connected to an IPR in which the IPN will then become programmed to provide any number of functional capabilities. These functional capabilities can then be transmitted to the user display to allow for an operator to interact with the IPN on how it should act, react or otherwise function in relation to the other components of the implement control system.

For example, the IPR can be programmed during manufacture, as previously disclosed. This can include information related to the planter, such as number of row units, type of seed delivery mechanism, type of down force providing, type of pressure to the seed meters, and/or any other factors that can be varied according to a planting implement. The IPNs can be attached to the planter wherein the IPR can transmit this information to the IPN via the high speed, high bandwidth Ethernet connections to provide information related to the planter to the IPN. The IPN can then recognize other components connected thereto and can provide functional options to an operator via the user display to allow for the operator to input desired outcomes, controls, parameters, or other inputs to allow the IPN to actively control components connected thereto based on said inputs. This quick plug-n-play style programming allows for the IPNs to be essentially un-programmed until connected to an IPR number. The blank programming of the IPN will allow for the quick association of the IPN with components connected thereto to allow for the control of said components regardless of any preprogramming. This is advantageous in that it saves time, cost, and other problems associated with specifically programming a control board with the functionality of components that it will be attached to.

Figure 11:
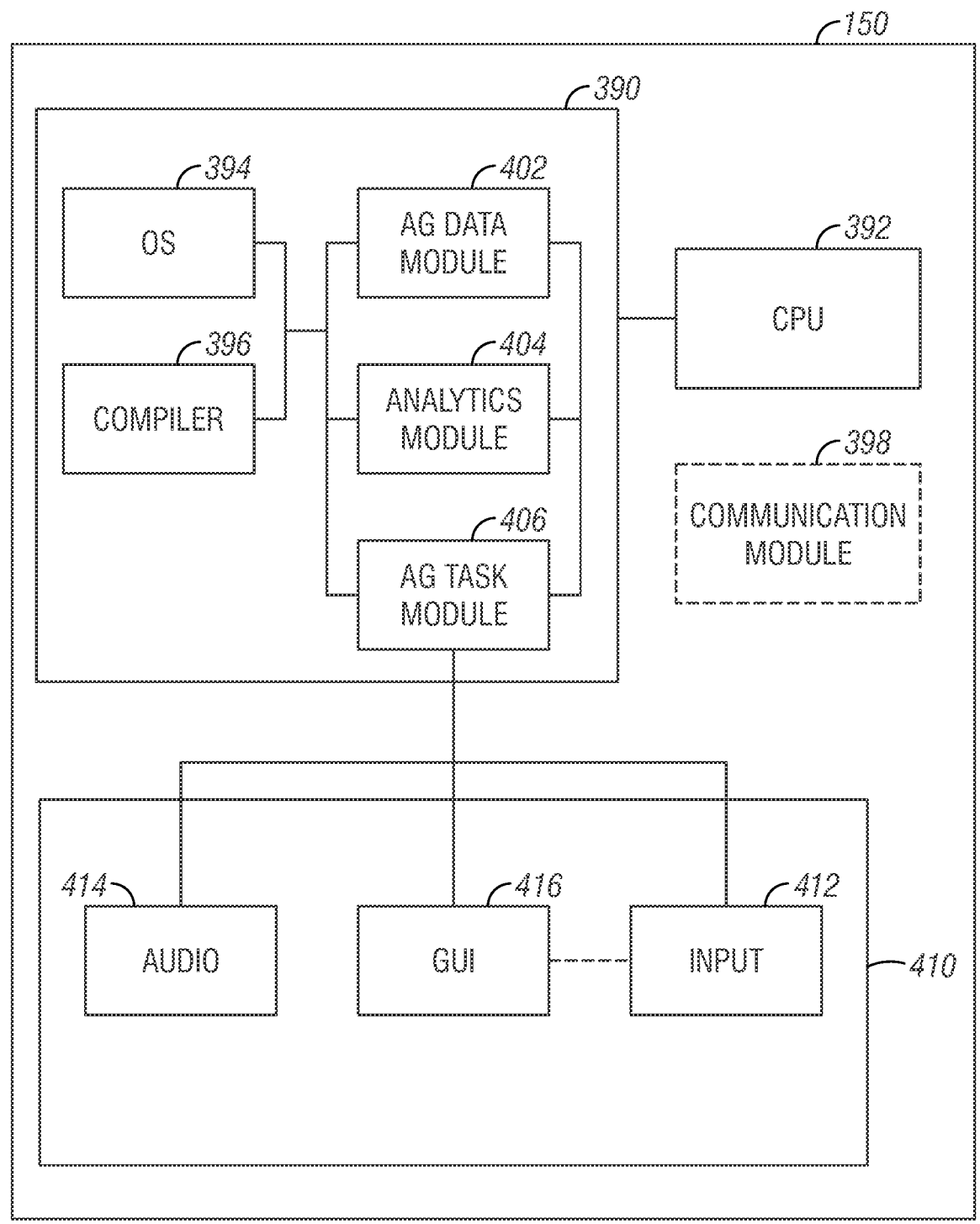
FIG. 11 illustrates, schematically, a hardware environment emphasizing computing components of an exemplary intelligent control, such as a tablet with a touch-screen display.

FIG. 11 illustrates, schematically, a hardware environment emphasizing computing components of an exemplary intelligent control 150, such as a tablet or other type of display unit with a touch-screen display.

The intelligent control 150 includes memory 390, which has a program storage area and/or data storage area. The memory comprises either read-only memory ("ROM", an example of non-volatile memory, meaning it does not lose data when it is not connected to a power source) or random access memory ("RAM", an example of volatile memory, meaning it will lose its data when not connected to a power source). Examples of volatile memory include static RAM ("SRAM"), dynamic RAM ("DRAM"), synchronous DRAM ("SDRAM"), etc. Examples of non-volatile memory include electrically erasable programmable read only memory ("EEPROM"), flash memory, hard disks, SD cards, etc.

A central processing unit 392, such as a processor, a microprocessor, or a microcontroller, is connected to the memory 390 and is capable of executing software instructions that stored in the memory 390. The central processing unit 392 is the electronic circuit which performs operations on some external data source, such as the memory 390 or some other data stream. The central processing unit 392 performs the basic arithmetic, logic, controlling, and input/output ("I/O") operations specified by the instructions.

As shown in FIG. 11, aspects of the intelligent control 150, including computer hardware and software resources of the modules, are managed by an operating system 394 stored in the memory 390. More particularly, a compiler 396 allows a software application written in a programming language such as COBOL, C++, FORTRAN, or any other known programming language to be translated into code to be read by the central processing unit 392. After completion, the central processing unit 392 accesses and manipulates data stored in the memory 390 of the non-transitory computer readable medium using the relationships and logic dictated by the software application and generated using the compiler 396.

In one embodiment, the software application and the compiler 396 are tangibly embodied in the intelligent control 150. When the instructions are read and executed by the central processing unit 392, the intelligent control 150 performs the steps necessary to implement and/or use the present invention. A software application, operating instructions, and/or firmware (semi-permanent software programmed into read-only memory) may also be tangibly embodied in the memory 390, agricultural data module 402, analytics module 404, ag task module 406, and/or data communication devices (e.g., communication module 398) thereby making any software application disclosed herein a product or article of manufacture according to the present invention.

The communications module 398 is capable of connecting the intelligent control 150 to a network, such as a cloud-computing network 202, and/or systems of interconnected networks, such as the Internet. In some embodiments, the intelligent control 150 and/or communications module 398 can include one or more communications ports such as Ethernet, serial advanced technology attachment ("SATA"), universal serial bus ("USB"), or integrated drive electronics ("IDE"), for transferring, receiving, or storing data. In other embodiments, a software licensing and delivery model usable in connection with the cloud-computing network 202 can be software as a service ("SaaS"), infrastructure as a service ("IaaS"), platform as a service ("PaaS"), desktop as a service ("DaaS"), a managed service provider, mobile backend as a service ("MBaaS"), or information technology management as a service ("ITMaaS").

The agricultural data module 402 includes the necessary hardware and/or software components and/or is electrically connected to other computing components such that the intelligent control 150 can more efficiently store, manage, and transmit agricultural data.

The agricultural data module 402 can also work in tandem with an analytics module 404 and/or user interface 410 to create more agricultural data, manipulate existing agricultural data, and/or display agricultural data.

The analytics module 404, in particular, can facilitate (i) amalgamation; (ii) separation; (iii) calculation, (iv) prediction, (v) instruction relating to agricultural tasks, (vi) comparisons, (vii) conversions, (viii) designation, (ix) reevaluation, (x) replacement, and/or (xi) deletion: of/with agricultural data. The analytics module can perform such functions automatically in response to receiving agricultural data or after a user prompts the analytics module 404 to perform a specific function.

The user interface 410, in particular, is how the user interacts with the intelligent control 150 and modules contained therein. The user interface 410 can be a digital interface, a command-line interface, a graphical user interface ("GUI") 416, any other suitable way a user can interact with a machine, or any combination thereof. For example, the user interface 410 can include a combination of digital and/or analog input/output devices or any other type of input/output device required to achieve a desired level of control and monitoring of the agricultural data and/or agricultural tasks. Input(s) received from the user interface 410 can be sent to a microcontroller to control operational aspects of the intelligent control 150. Examples of input devices 412 include computer mice, keyboards, touchscreens, knobs, dials, switches, buttons, etc. Examples of output devices include audio speakers 414, displays for graphical user interfaces 416, light emitting diode (LED) indicators, etc. In at least one embodiment, graphical user interfaces 416 are capable of displaying agricultural data sensed in real time on a map.

In order to provide accurate and up-to-date information, the GPS 145, 146 of either the tractor 100 and/or the planter 110 is important. Precision farming relies on very accurate and timely knowledge of physical location. Yields can be directly attributed to how precise spacing of seed can be performed. Conventional GPS to-date has limitations in accuracy that need to be augmented from other sources. Additionally, due to obstructions, atmospheric events, or other impacts outages in receiving GPS data present a challenge to farming operations. Therefore, according to aspects of the invention, an assortment of data sources may be used to enhance the location data of traditional GPS. Traditional forms in practice are tied into the GPS receiver itself where corrections are provided from base stations, cellular modems, etc. If these are not available or desired, there is a need additional data sources.

Figure 4:
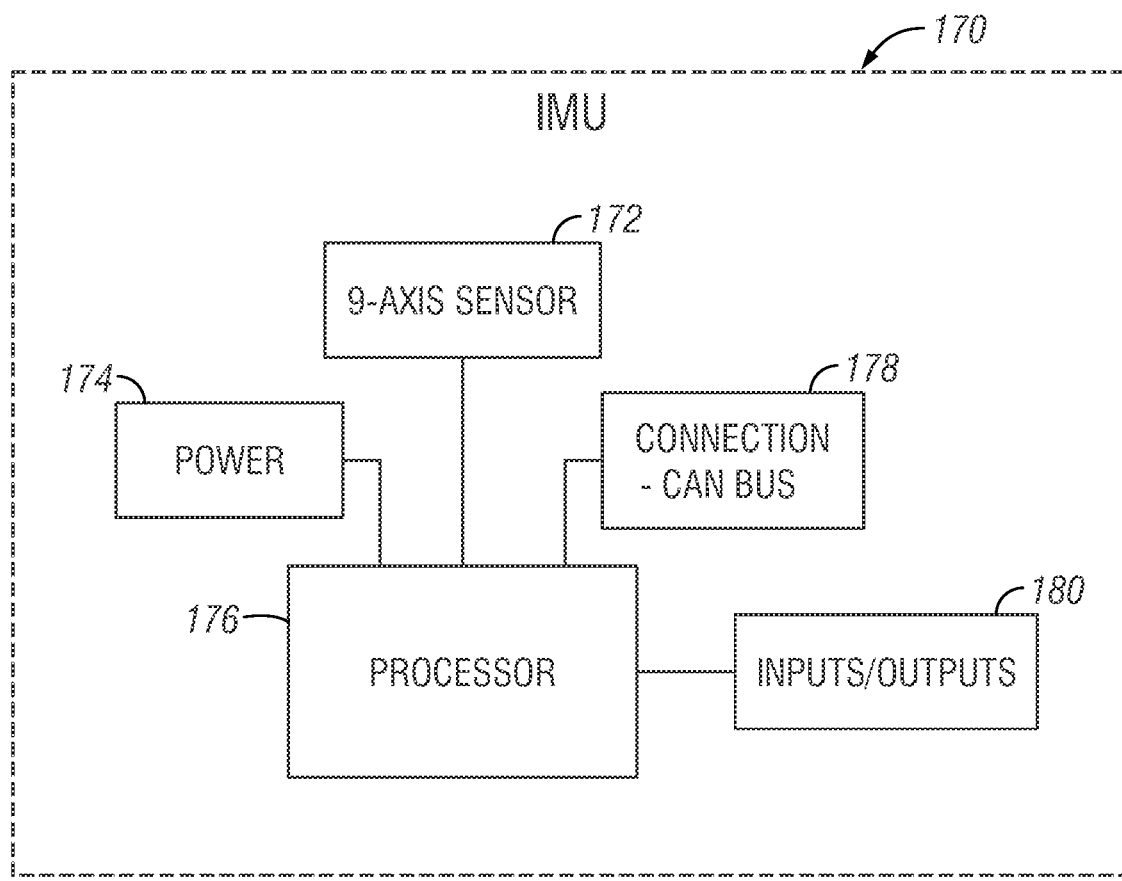
FIG. 4 is a schematic of a GPS augmentation system according to aspects of the present disclosure and/or invention.

An Inertial Measurement Unit (IMU) 170, such as shown in FIG. 4, can be used in conjunction with GPS to provide absolute positioning, and with accumulated knowledge, use IMU measurements to continue spatial tracking and operation until a GPS outage has concluded. Use of an additional speed and direction tracking source such as a wheel speed sensor enhances this capability and extends the amount of time for which it is valid. An IMU, generally, is an electronic device that measures and reports a body's specific force, angular rate, and sometimes the orientation of the body, using a combination of accelerometers, gyroscopes, and sometimes magnetometers.

The IMU 170 can be added with the GPS information from the planter and/or the tractor in order to enhance location data. Such location data can include, but is not limited to, the location of the tractor, location of the implement, or even the location of an event or operation performed by the implement. For example, according to at least some aspects of some embodiments of the present disclosure, the combination of the GPS information and the IMU information could be combined to provide precise or near-precise information related to the location of a planted particulate (i.e., seed). This enhanced information would allows better data to be obtained. Such data can include, but is not limited to, precise planting location for yield data, location for prescription maps, planted information to mitigate later compaction of the planted zone, as well as any other sensed information (e.g., anomaly information, voids, obstructions, soil information, soil moisture, soil type, climate information, speed, 9-axis movement information, and/or elevation information).

Still further, the IMU 170 information could be used in place of GPS information, such as during an outage or in a location where the GPS location is interrupted, sketchy, or otherwise compromised, such as in valleys or other locations where there may be something in the way between the implement and a GPS satellite or other provider. In such a situation, the IMU information can be used to estimate data that would indicate the location and movement of the tractor/implement combination during the GPS outage. This can be done in a number of ways, including, but not limited to, heading and speed information. Once the GPS information is back online, the intelligent control 150, such as that in the tractor or other towed vehicle 100, can attempt to interpolate the outage and the information obtained during the outage by the IMU 170 to fill in the locational gap during the GPS outage. Thus, the IMU 170 could be to enhance GPS location or provide information during a GPS outage.

As shown in FIG. 4, the IMU 170 includes numerous components. In addition, it should be appreciated that these are not limiting, and an IMU 170 as contemplated by the invention could include greater or fewer of the components.

The components of the IMU include many features and subcomponents, including, but not limited to, Processing/Logic 176 (e.g., Processor, shown to be an ARM 32-bit Cortex-M3, from Texas Instruments), Interfaces 178 (e.g., drivers, other switches, CANs, etc.), Isolation, Connectors, or other inputs/outputs 180 (e.g., 12-pin, 2-pin, 6-pin, headers, sockets, JTAGs, etc.), Voltage Sources (12V, 5V, 3V), Power Supply, Passive Components (transformers, etc.), and Sensors (9-axis inertial measurement sensor 172). There can also be separate power source 174, which can be built in as a battery or can be external via a wired or wireless power source. As shown in the Figure, there are also a number of discrete and/or multiple/BUS connections.

The processor/logic 176 can also be referred to as a processing unit. A processing unit, also called a processor, is an electronic circuit which performs operations on some external data source, usually memory or some other data stream. Non-limiting examples of processors include a microprocessor, a microcontroller, an arithmetic logic unit ("ALU"), and most notably, a central processing unit ("CPU"). A CPU, also called a central processor or main processor, is the electronic circuitry within a computer that carries out the instructions of a computer program by performing the basic arithmetic, logic, controlling, and input/output ("I/O") operations specified by the instructions. Processing units are common in tablets, telephones, handheld devices, laptops, user displays, and other computing devices. One or more embodiments described herein can be implemented using programmatic modules, engines, or components. A programmatic module, engine, or component can include a program, a sub-routine, a portion of a program, or a software component or a hardware component capable of performing one or more stated tasks or functions. A module or component can exist on a hardware component independently of other modules or components. Alternatively, a module or component can be a shared element or process of other modules, programs, or machines.

In addition, the IMU 170 could include any number of sensors. The sensors could be associated with a single device, or positioned in, on, and/or around the implement to acquire additional information, which could then be transmitted to the processor for configuration and determination of information, such as location information. It is contemplated that the implement includes sensors and/or modules. Modules can be placed on and around the implement and include various sensors to provide information to an intelligent control. The sensors may include vision sensors, radar sensors, LIDAR sensors, heat sensors, moisture content sensors, radio frequency sensors, short-range radio, long-range radio, antennas, and the like. These sensors can be grouped in any manner and can be used to determine many aspects. For example, the sensors can be used to determine the location of a nearby object or obstruction. The sensors may be used to determine soil characteristics, such as moisture content, compaction, temperature, and the like. The sensors can also be location sensors to determine if the implement is on level ground, on a side hill, going up or down hill, etc. The location sensors can also determine areas in which the implement is not to travel, based upon predetermined and/or programmed data. The sensors can then indicate to actuators or other mechanisms on the implement to mitigate rolling over, becoming stuck, running into an object, or otherwise putting the machine in an undesirable situation. The sensors could also be used with location determining systems, such as GPS. The combination of the sensors and location determination systems would allow an implement to travel to a location without running into obstructions, without running into other implements, without damaging planted or existing crops, as well as with obeying other rules, such as traffic regulations. The sensors and/or location determining systems would allow an implement to travel from one location to another, to locations within a field, or otherwise in combination with additional vehicles safely and precisely.

The sensors sense one or more characteristics of an object and can include, for example, accelerometers, position sensors, pressure sensors (including weight sensors), or fluid level sensors among many others. The accelerometers can sense acceleration of an object in a variety of directions (e.g., an x-direction, a y-direction, etc.). The position sensors can sense the position of one or more components of an object. For example, the position sensors can sense the position of an object relative to another fixed object such as a wall. Pressure sensors can sense the pressure of a gas or a liquid or even the weight of an object. The fluid level sensors can sense a measurement of fluid contained in a container or the depth of a fluid in its natural form such as water in a river or a lake. Fewer or more sensors can be provided as desired. For example, a rotational sensor can be used to detect speed(s) of object(s), a photodetector can be used to detect light or other electromagnetic radiation, a distance sensor can be used to detect the distance an object has traveled, a timer can be used for detecting a length of time an object has been used and/or the length of time any component has been used, and a temperature sensor can be used to detect the temperature of an object or fluid.

It should be noted that, in at least some of the aspects and/or embodiments disclosed herein, the sensors and/or IMUs are located on separate independent platforms, such as on both the tractor 100 and implement 110. The interconnected high speed network makes the fusing possible. Aspects of the invention include using the sensors individually to determine the state (orientation and position) of the platforms and then fusing them into a position solution for the implement to use. Then, when GPS is unavailable, the platform state is preserved and the remaining sensors contribute to maintaining the platform state through motion for the implement.

Still additional information could be obtained from the IMU 170, such as weather information (temperature, moisture/humidity, air pressure, saturation, wind information, and the like).

Figure 5:
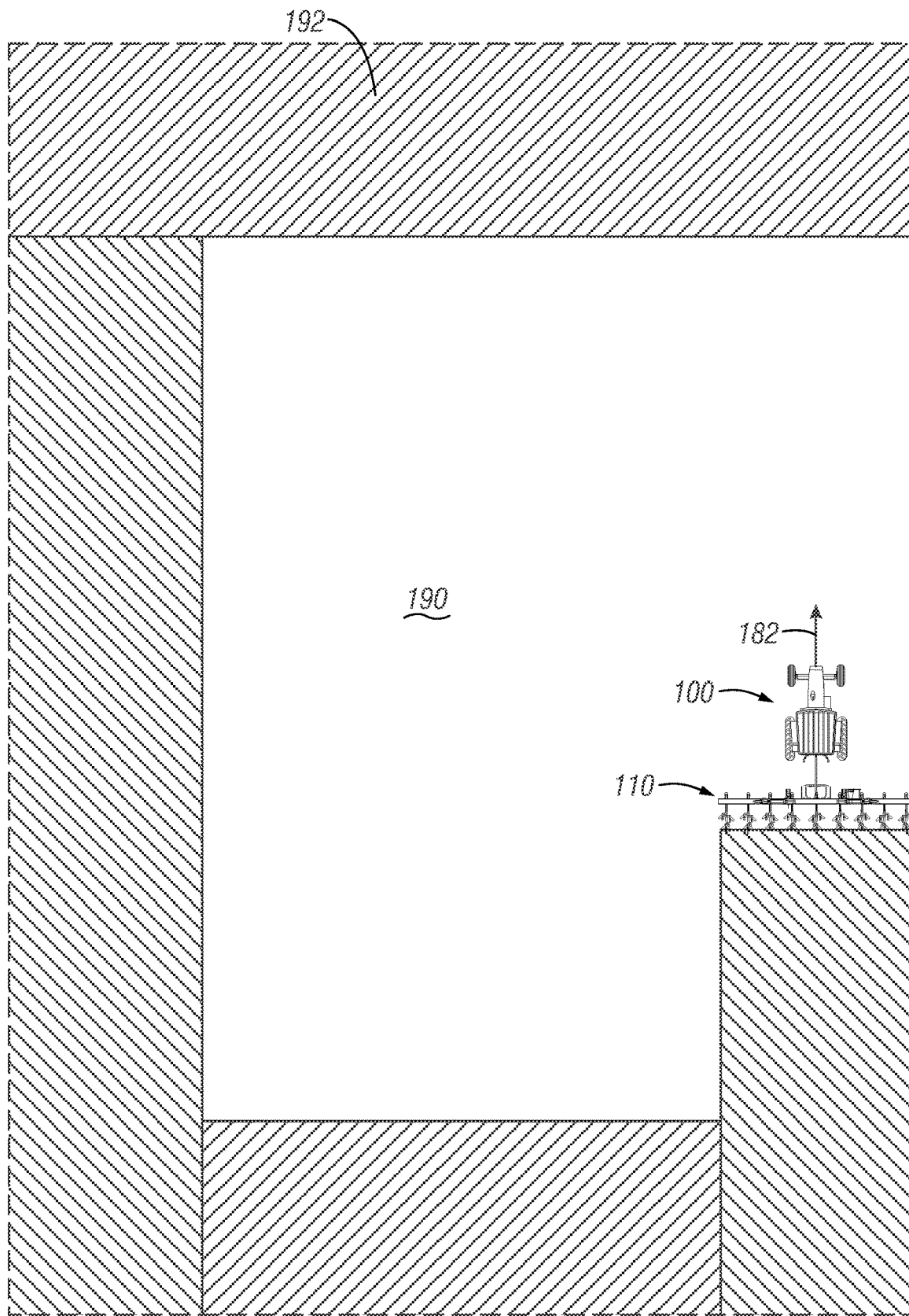
FIG. 5 is a schematic diagram showing an agricultural machine in a field.

FIG. 5 is a schematic of a field 190 being planted by a tractor 100 and planter 110 combination. The schematic shows the combination traveling in the direction of the arrow 182. Additional information shown in the figure is planted information 192. The planted information 192 shows the path that the combination has taken and the location of the field 190 that has been planted. This is shown by the cross-hatching 192. As will be understood, this information can be important, as it is undesirable for a planted location to be planted again or even driven over, which could cause compaction that could affect the growth of the planted crop and end yield. This can especially be important when there are multiple machines in a common field 190 so that each knows the location and performed operations (i.e., planted location) of the other so that overplanting or replanting is mitigated. The information, as will be appreciated, can be shown on a user interface, such as in a tractor, in the field, or in any other remote location from the field.

Figure 6:
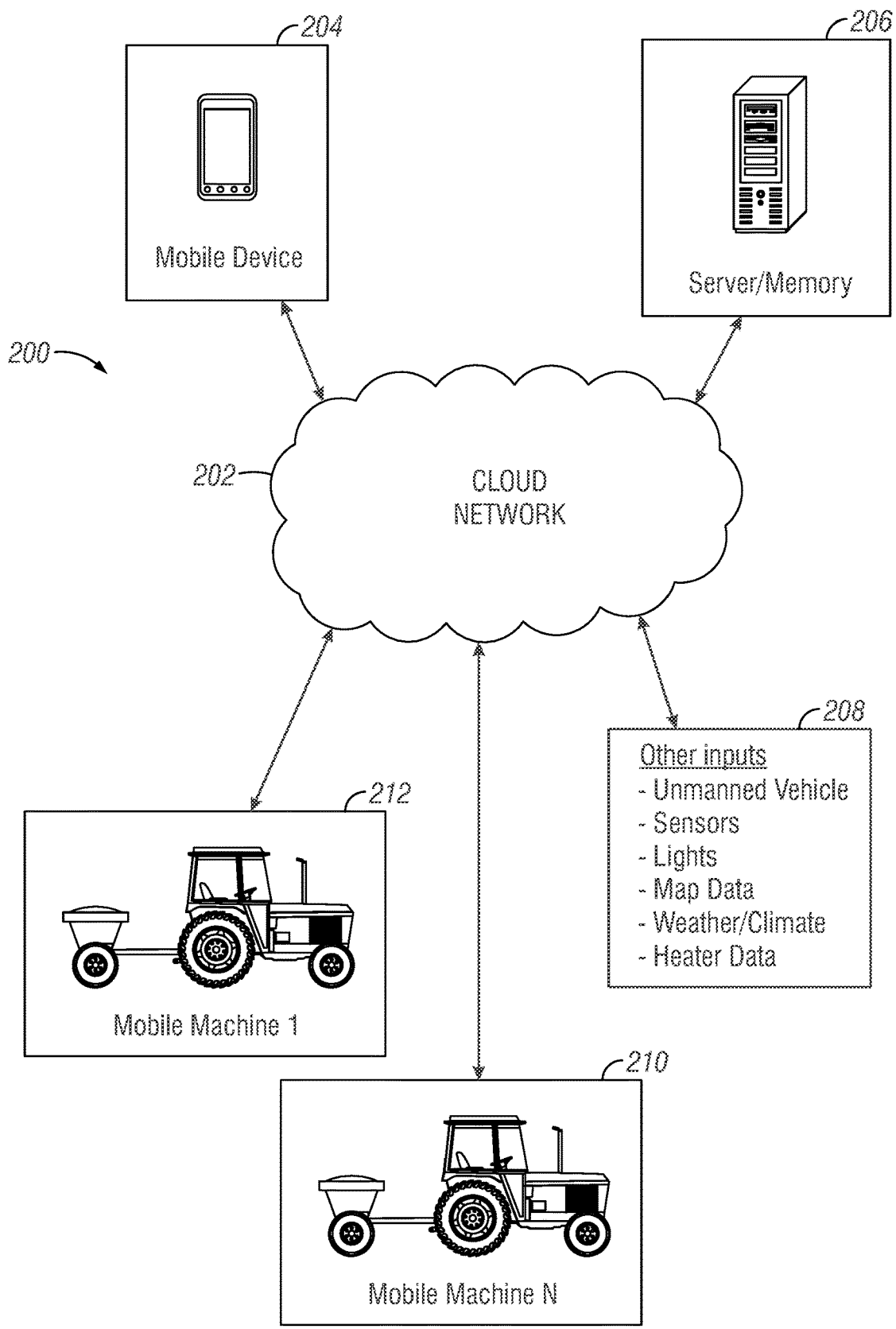
FIG. 6 is a diagram of components of a system where information is shared between multiple agricultural machines and/or devices.

Still further, the information, including the location of an operation such as planted information 192, such as that shown in FIG. 5, can be information that is shared as part of a network 200, such as that shown in FIG. 6. FIG. 6 is an exemplary showing of a network for communicating information from a planter. The information could be transmitted to many locations of the network, such as but not limited to, additional implements, mobile devices, servers/computers, or other nodes, members, devices, or the like of the network. It should be appreciated that the network could be a cloud network, internet-based network, or cellular network. In some embodiments, the network is, by way of example only, a wide area network ("WAN") such as a TCP/IP based network or a cellular network, a local area network ("LAN"), a neighborhood area network ("NAN"), a home area network ("HAN"), or a personal area network ("PAN") employing any of a variety of communication protocols, such as Wi-Fi, Bluetooth, ZigBee, near field communication ("NFC"), etc., although other types of networks are possible and are contemplated herein. The network typically allows communication between the communications module and the central location during moments of low-quality connections. Communications through the network can be protected using one or more encryption techniques, such as those techniques provided by the Advanced Encryption Standard (AES), which superseded the Data Encryption Standard (DES), the IEEE 802.1 standard for port-based network security, pre-shared key, Extensible Authentication Protocol ("EAP"), Wired Equivalent Privacy ("WEP"), Temporal Key Integrity Protocol ("TKIP"), Wi-Fi Protected Access ("WPA"), and the like.

As shown in FIG. 6, the network 200 may be a cloud network 202. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. A cloud computing environment is service oriented with a focus on statelessness, low coupling, modularity, and semantic interoperability. At the heart of cloud computing is an infrastructure comprising a network of interconnected nodes.

Exemplary Characteristics of a Cloud Computing Model

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Exemplary Service Models of a Cloud Computing Model

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Exemplary Deployment Models of a Cloud Computing Model

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

An illustrative cloud computing environment 200 includes one or more cloud computing nodes with which local computing devices used by cloud consumers. The computing devices 204 can include, for example, personal digital assistant ("PDA") or cellular telephone, desktop computer, laptop computer, and/or any suitable other type of computer systems or other mobile devices. Cloud computing nodes will communicate with one another and may be grouped physically or virtually, in one or more networks, such as private, community, public, or hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices are intended to be illustrative only and that computing nodes and cloud computing environment 200 can communicate with any type of computerized device over any type of network and/or network addressable connection (e.g., using a web browser).

The information of the network 200 could be sent to and from and/or stored on a server or other memory 206. The memory includes, in some embodiments, a program storage area and/or data storage area. The memory can comprise read-only memory ("ROM", an example of non-volatile memory, meaning it does not lose data when it is not connected to a power source) or random access memory ("RAM", an example of volatile memory, meaning it will lose its data when not connected to a power source). Examples of volatile memory include static RAM ("SRAM"), dynamic RAM ("DRAM"), synchronous DRAM ("SDRAM"), etc. Examples of non-volatile memory include electrically erasable programmable read only memory ("EEPROM"), flash memory, hard disks, SD cards, etc. In some embodiments, the processing unit, such as a processor, a microprocessor, or a microcontroller, is connected to the memory and executes software instructions that are capable of being stored in a RAM of the memory (e.g., during execution), a ROM of the memory (e.g., on a generally permanent basis), or another non-transitory computer readable medium such as another memory or a disc.

The server 206 could also include agricultural data and/or modules. Such data could be categorized and/or separated into layers. For example, a first layer of the agricultural data can comprise planting information such as (a) an instruction to plant or not to plant; (b) seed and/or fertilizer type; (c) seed spacing; and (d) depth of planting. For example, a second layer of the agricultural data can comprise planting efficiency information such as (a) singulation (including skips and/or doubles); (b) fertilizer rates; (c) insecticide rates; (d) ground contact rates; (f) downforce rates; and (f) population rates. For example, a third layer of the agricultural data can comprise time, geospatial, and/or weather forecast information such as (a) time of day; (b) air temperature; (c) season; (d) a weather condition; and/or (e) geospatial coordinates. For example, a fourth layer of the agricultural data can comprise vehicle information such as (a) heading, such as a direction or bearing, of the implement and/or tow vehicle; (b) velocity or speed of the implement and/or tow vehicle; (c) fuel level of one or more fuel tanks on the implement and/or tow vehicle; and/or (d) technical capabilities of the implement and/or tow vehicle. For example, a fifth layer (not shown) of the agricultural data can comprise soil information such as (a) moisture content; (b) compaction; (c) ground temperature; (d) elevation; (e) depth; (f) slope of terrain; and/or (g) soil composition. Symbols and/or values for the agricultural data can be displayed via graphical user interface. The agricultural data can be designated as historical data, temporary data, live data, anticipated data, predictive data, or the like.

Additionally, as shown in FIG. 6, one or more mobile machines are shown. This includes a first mobile machine 212 and a mobile machine 210 designated as N, wherein the N refers to any number of mobile machines. This could include two or more machines operating in a common field or fields remote from each other, wherein the information from each of the mobile machines is communicated via the network 200. The mobile machine could be generally any agricultural implement or machine performing one or more agricultural operations or functions in a field, so as to communicate and document the information, including the information related to the time, location, and circumstances associated with the operation.

Also shown in FIG. 6 are additional inputs 208 that are part of the network, and which provide information for current and historical mapping, evaluation, transmitting, analysis, or otherwise. Such inputs can include, but is not limited to, GPS information or other location information (such as from an unmanned autonomous vehicle, remote controlled vehicle, tower, or the like), sensor information, prescription maps, map data, weather or climate information, and/or historical data (yield, obstruction, planted locations, path information, or the like). Any additional information that could be used for agricultural purposes should be considered a part of the network.

Figure 7A:
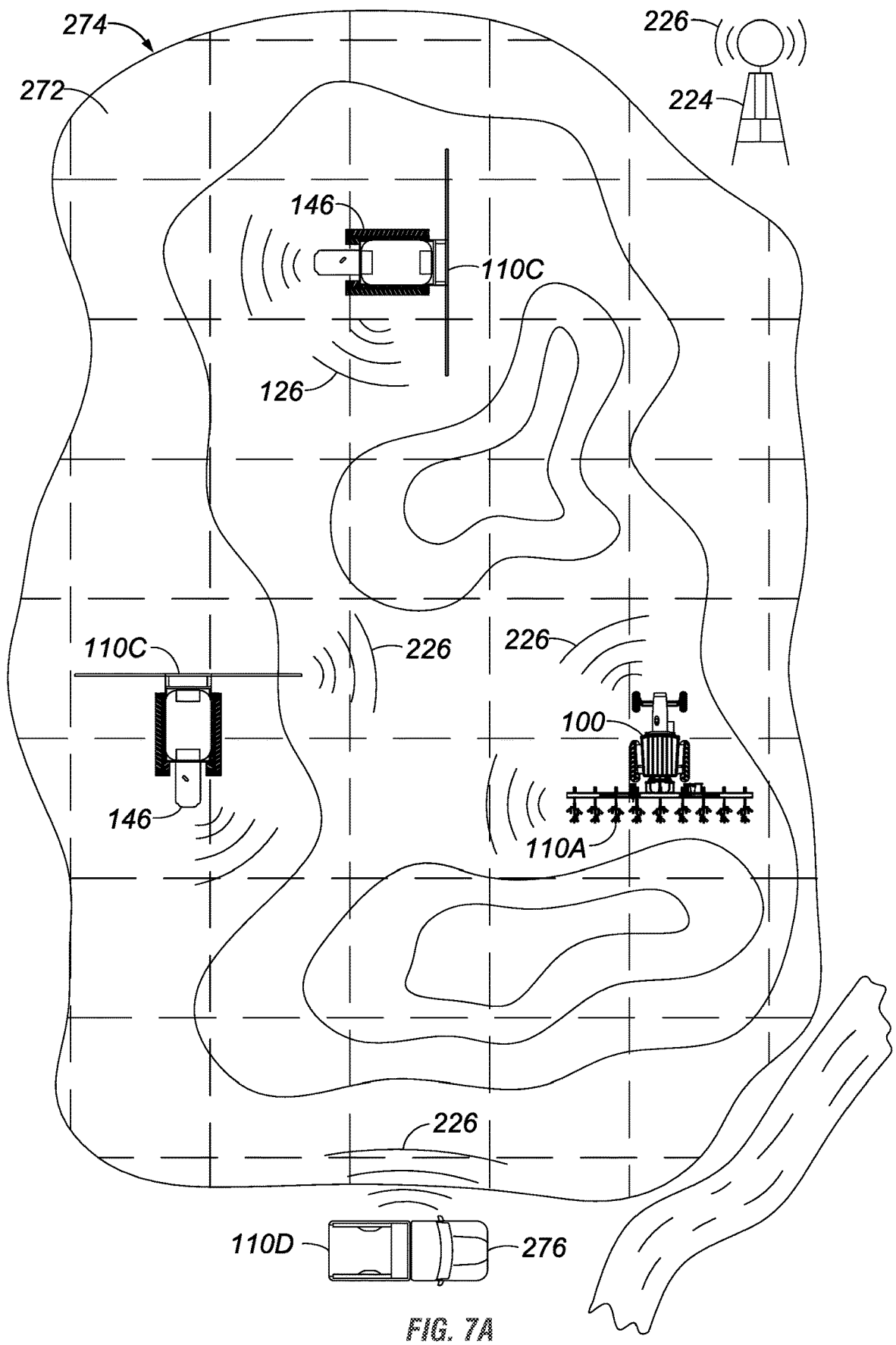
FIG. 7A is a schematic diagram showing multiple agricultural machines in a common field.

FIG. 7A is a schematic diagram showing multiple units in a field 274. As shown in FIG. 7A, the field 274 can be subdivided into several geographic regions 272. Computerized information including that which represents an actual drive path for an associated geographic region 272 can be communicated among several intelligent controls 150 in remote locations. The tractor 100 and/or agricultural implement 110 can be located within the geographic region 272. The field 274 may include a first machine 146, such as a tractor and/or tractor and implement combination, such as the autonomous tiller 146+110C, a second machine 146 attached to an implement, such as a tiller 110C, and a tractor 100 attached to a planter 110A. Furthermore, there can a truck 276 towing a storage bin 110D shown outside the field 274. The first and second machines 146, as well as the tractor 100 are performing an operation within the field. The use of the multiple vehicles in the field at the same time will reduce the amount of time to complete the operations.

In order to ensure that tractors 100, machines 146, and/or a truck 276 do not overlap one another or otherwise run into one another, the vehicles emit network signals 226, which can be communicated and transmitted between each other. The network signals 226 can include a vast amount of information. For example, the network signals 226 can communicate the location of the units relative to one another as well as relative to the location in the field 274. The location information can also include the location of any performed agricultural activity, such as tilling, planting, particulate placement (e.g., liquid or dry fertilizer), harvesting, spraying, or the like. The network signals 226 can also communicate any alerts, warnings, status updates, or other actions that may be occurring. For example, alerts can be sent where a unit is low on material, a unit is damaged, an obstruction is detected, a general status of soil conditions, trash build up, weed concentration, and/or the like is updated, etc.

Furthermore, FIG. 7A shows a tower 224 emitting a network signal 226. The tower 224, which could be one of many towers around the field, can provide additional location determining aspects for the field 274, and can be used to supplement or otherwise augment GPS, IMU, or other information. The height and/or position of the tower 224 may increase the efficiency of the communication between the actors in the field. The tower 224 can also communicate to another field or to a master module located at a different location as to the status, alerts, warnings, or other data obtained by the vehicles in the field. In addition, it is contemplated that the agricultural data from the network signals 226 can be stored for future purposes. For example, as the units operate in the field 274, they can obtain data, such as field conditions to prepare future planting schedules and/or maps.

Figure 7B:
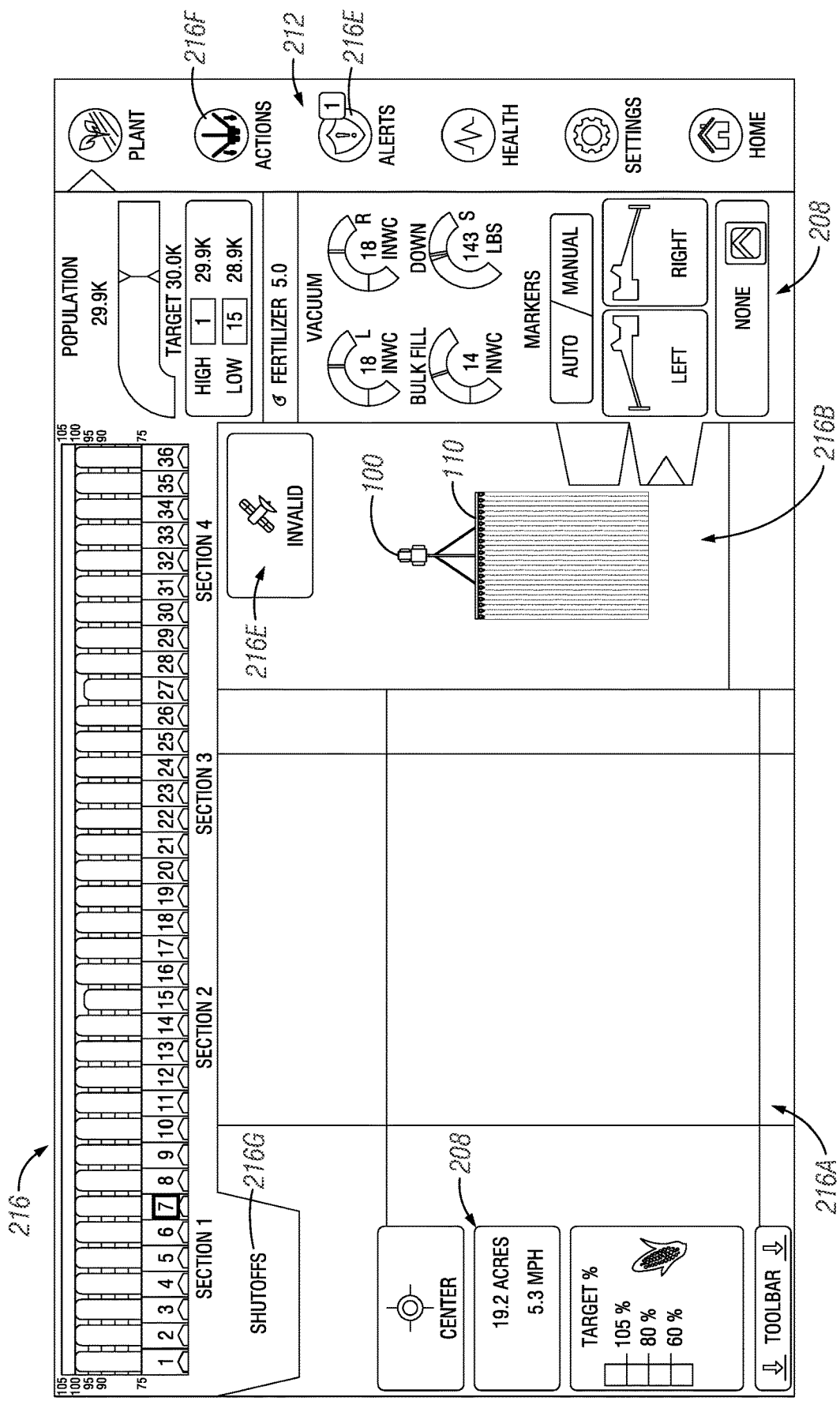
FIG. 7B is an exemplary screen depiction of one of the agricultural machines of FIG. 7A.

FIG. 7B is a view of an exemplary graphical user interface 216 showing one user's view of at least one of the tractor/implements such as that shown in FIG. 7A. For example, as the operator travels via tractor 100 through a field 274, the user is able to view agricultural data in real-time before the agricultural data or aspects thereof are converted, stored, and/or displayed as historical data. As shown, a mapped view 216A shows areas (represented with dashed lines rear of the planter 110) which have recently been worked (e.g. tilled, planted, fertilized, etc.) by the agricultural implement 110. If an aspect of the agricultural and/or computerized system becomes unavailable and prevents live data from being displayed on a map, the computerized system will provide a means for tracking as much data as is available before the aspect becomes available again. For example, data and information from the IMU 170 can be used to estimate an area or areas of a field that have been worked during a time of GPS outage. As disclosed, the system can utilize the known heading in multiple axes/directions, speed, any path planning, historical data, information from other machines, and the like, to provide an estimate of where the field has been worked during the time of outage. This information can be used to fill in any lost data that has occurred during the time of GPS outage.

So that the user can gauge whether aspects of the system are unavailable, there can exist a visual status indicator 216E on the display which may communicate one or more aspects of the system are available. The visual status indicator 216E indicates if the differential GPS system is available and thus the graphical user interface 216 displays only live data and a single mapped view 216A. In FIG. 7B, the visual status indicator shows the differential GPS system is not currently available.

The graphical user interface 216 can also provide the user the ability to select actions 216F, via input devices 212 (such as touch screen controls), which allows (e.g. via modules 202, 204, 206) for navigation of the computerized system and/or for the agricultural system to perform certain agricultural tasks. Similarly, safety controls 216G allow the operator is able to engage safety elements on the agricultural implement 110.

Figure 8A:
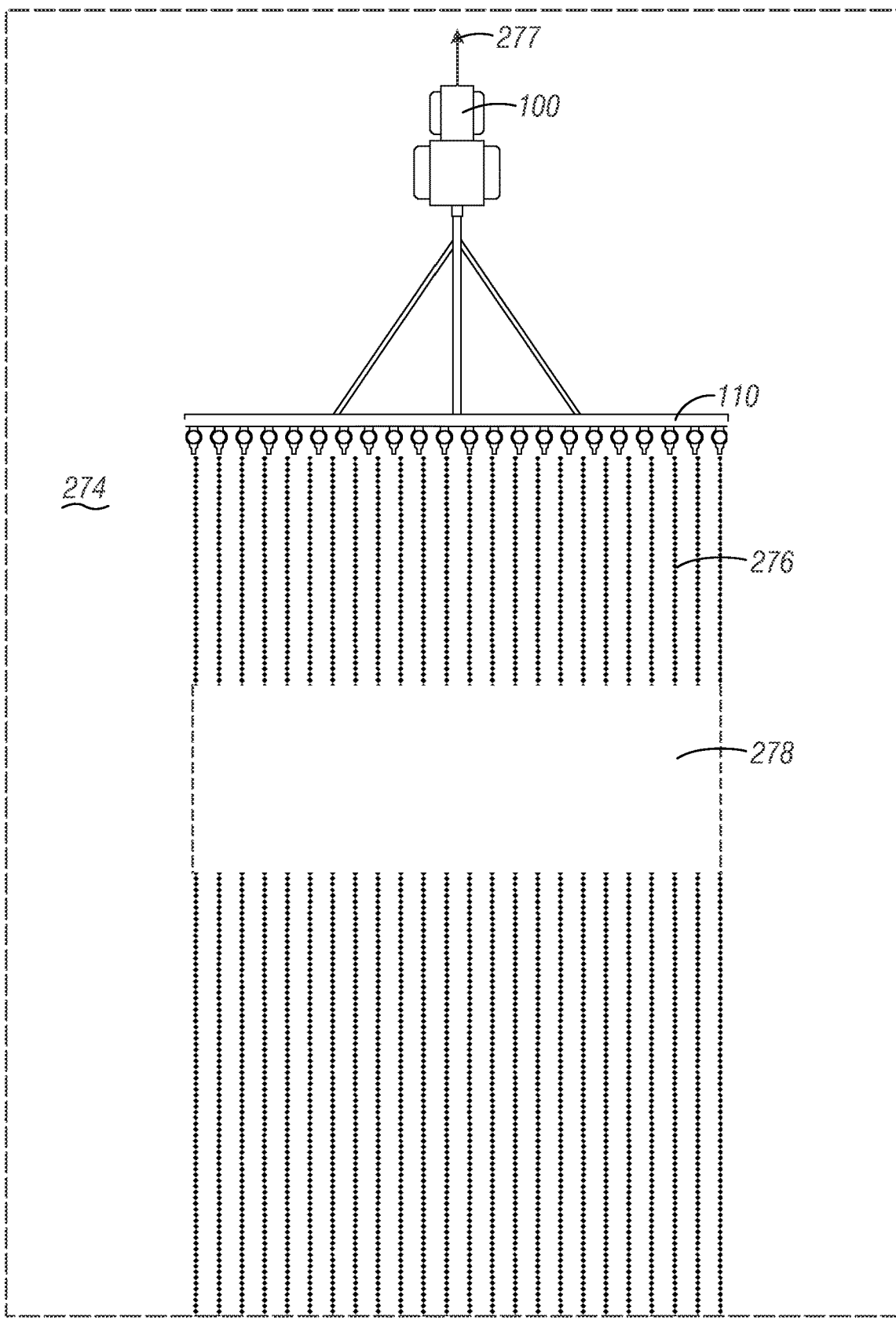
FIG. 8A is a schematic diagram of an agricultural machine in a field that has lost GPS information.

As shown in FIG. 8A, which is a schematic of a portion of a screen, user interface, or other indication of a tractor 100 and planter 110 in a field 274, the arrow 277 shows the direction of travel. This can be provided by GPS, IMU, or some combination thereof. As shown in the figure, the portion 276 indicates a location of a worked portion of the field, such as a portion of the field that has been planted. Also shown in the figure by the blank portion 278 is an area depicted as being without GPS, such as outage or location where the GPS is not available. As shown in the example, a display or interface would not be able to be certain what has occurred during this outage. However, the use of the information from the IMU can let the system estimate that the planting has occurred. This can be done by the IMU information, as well as any stored information, such as in the form of algorithm, path planning, autosteer, or other programs that indicated the planned path of the tractor/planter combination.

Figure 8B:
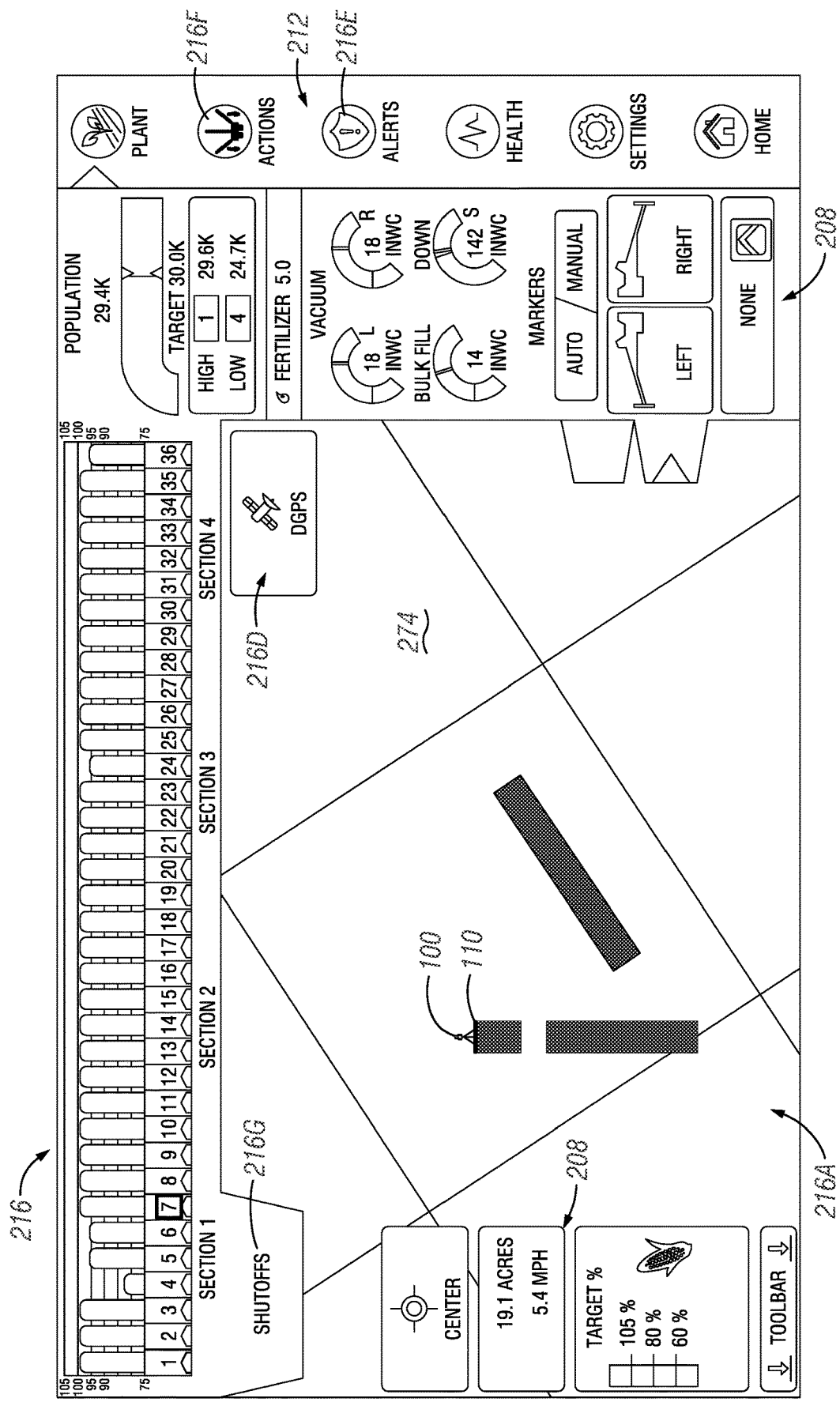
FIG. 8B is an exemplary screen depiction of the agricultural machine of FIG. 8A.

This is further shown in exemplary form in FIG. 8B, which shows a portion of a field 274 showing planted portions and outage portions. The dark black portions of the screen 216 indicate that the field has been worked (e.g., planted). The gap in the vertical portion may be indicative of a GPS outage. Thus, the system is not certain that the field 276 has been worked at this location. However, the IMU location can essentially fill in the lost locations and provide some confidence that the area of the field has been worked, which can then be used to fill in the gap to indicate that the full, intended portion of the field has been planted or otherwise worked. This information can then be shared with another location, such as a remote handheld or another machine, in the common field 274 or another field.

Figure 9:
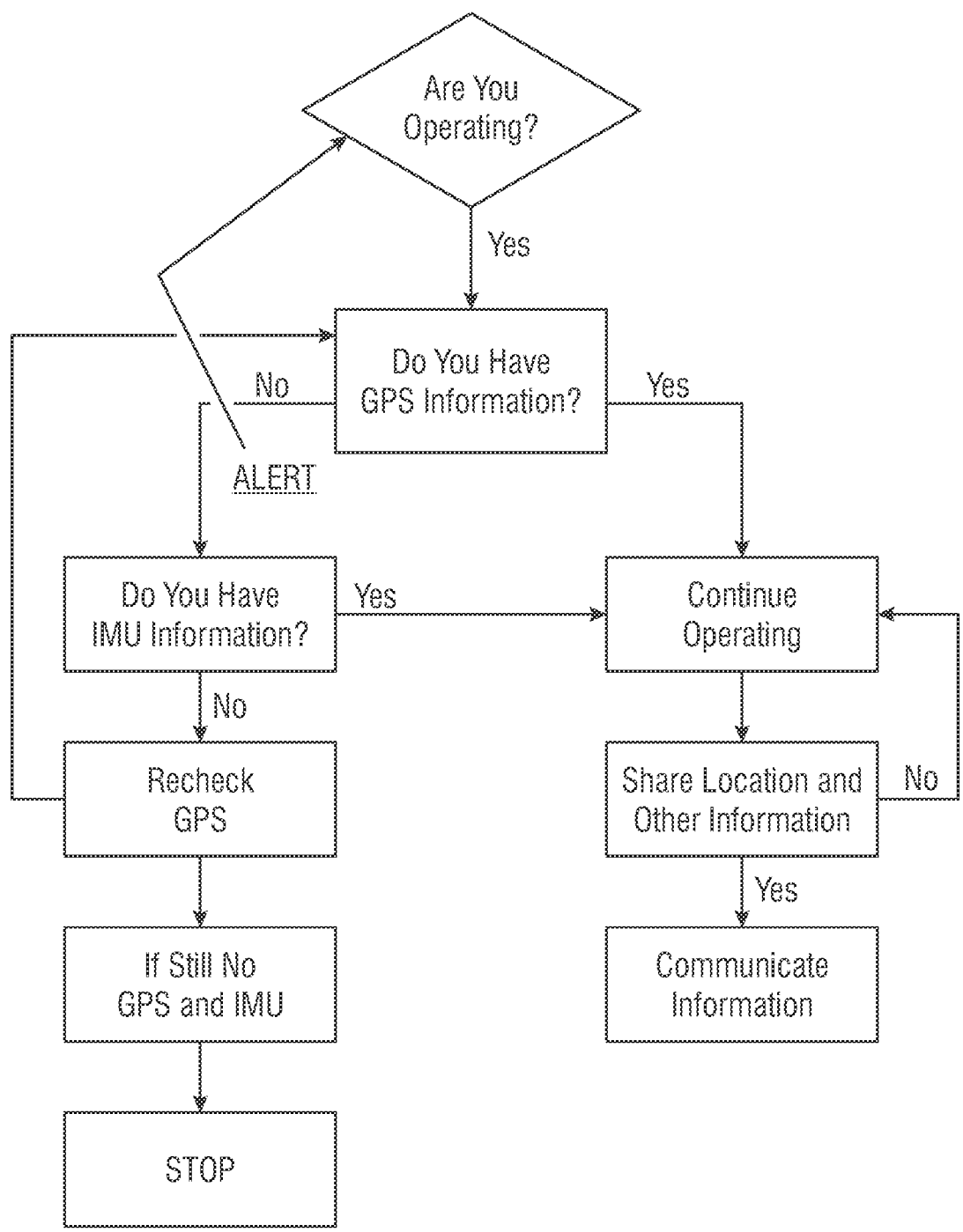
FIG. 9 is a flow diagram showing a method of operation for a location system of an agricultural machine.

FIG. 9 shows a flow diagram for a system, such as the controller/display 150 in a tractor, to determine if GPS is available, and if not, what should or can occur to continue operations. As shown in the figure, the first step is if the machine/user is operating a piece of agricultural equipment. This could be in the way of a user-driven tractor-implement combination, or could be in the form of an autonomous unit that is operating based upon programmed instructions. See, e.g., co-owned U.S. Pat. No. 10,104,824, which is hereby incorporated by reference in its entirety. This could be in many forms, but could be, for example, a query if a planter is being used to plant, or even if a tractor is moving through a field. If no, that is the end of the query. If yes, the next query is to determine if there is adequate GPS information being received to provide location services. The GPS location can be used for current heading, pre-programmed path planning, autosteer, or generally any operation where the location is needed or desired.

The determination of adequate GPS aids in determining the operation. As has been shown in FIGS. 7B and 8B, a display 216 can include a portion of the display, such as at box 216D and 216E, that indicates if the GPS is working properly for the current operation. If, as at 216D, there is adequate GPS, the machine can continue operating and tracking operation. This information can be shown on a display, saved to a memory, and/or shared with one or more remote devices. The shared information can include location information, operation information (planted seed, tilled location, obstruction, void, applied particulate, harvested crop, or generally any other agricultural operation), time information, and/or anything else associated with the operation of the agricultural machine. The information does not need to be shared, and the machine can continue without sharing. However, if it is desired to share the information, this can be communicated over a network, such as, but not limited to, one of the cloud networks, WiFi networks, cellular networks, LAN, WAN, Bluetooth, Zigbee, NFC, Point-to-Point Protocol ("PPP"), High-Level Data Link Control ("HDLC"), or other means of communication such as has been disclosed or otherwise is known. The information could be shared in real time with a remote device, machine, or user to provide real time information for the operation or could be shared after the fact at a later time. There could be both concurrent sharing and later sharing as well.

Moving back to the query of adequate GPS, when there is not adequate GPS, such as during a GPS outage, interruption, disruption, or other, such as if in a location where the machine is not capable of adequate connection with a GPS source, the system can identify as such. This can be in the form of an alert on a display, or can simply be indicated on the display, such as at the box 216E (see, e.g. FIG. 7B). Whatever the reason, when the system determines that there is not adequate GPS, in addition to providing an alert or otherwise indicating the same, the next query would be if there is IMU information that has been and will continue to be acquired. As noted, this information can include generally any information related to the operation of the machine, and can include sensors, LIDAR, RADAR, heading information (e.g., 9-axis sensor 172), speed, climate, etc. If there is adequate IMU information, this can be used in place of the GPS locational information to allow for the continued operation of the machine in near normal operation. At that point, the machine would continue operating, acquiring information, and asking about sharing of the information.

As noted, the IMU information can be used to estimate the location of the machine and operation of the same even without the GPS information. Once the GPS information has returned, the IMU information can be used to fill in any gaps in tracking of operation to fill in the gap where the GPS information would have otherwise provided the location of the machine operation, such as in the gap shown in the dark portion of the display in FIG. 8B. The IMU information will be detailed enough that the machine could continue operation and even share the information, in real time or at a later time, with the confidence that it is correct.

If there is not sufficient IMU information being acquired, or even if there is, the system will continue to check on the status of the GPS to determine when the GPS information has returned. The machine will be able to continue with the IMU, if desired, and once the GPS has returned, the uninterrupted operation of the machine will continue as well. This will mitigate any downtime associated with the loss or interruption of a GPS connection for providing locational, time, or other information that could be used to identify an agricultural operation.

However, if it is determined that there is not sufficient or adequate GPS information being received, and there is also insufficient IMU information to continue normal operation of the machine, the system will provide an alert and may even stop the machine operation. This is to ensure that there are not agricultural operations being performed and not tracked, which would mitigate the potential for an unwanted action (compaction, multiple planting, multiple application, other disruption) to occur in an area where an agricultural operation has already occurred, but was not documented.

The system can then be troubleshooted to determine the cause of the GPS outage/disruption, as well as any issue with an IMU, to attempt to get the information to continue the agricultural operation of the machine.

These instructions can be part of a database. The database is a structured set of data typically held in a computer. The database, as well as data and information contained therein, need not reside in a single physical or electronic location. For example, the database may reside, at least in part, on a local storage device, in an external hard drive, on a database server connected to a network, on a cloud-based storage system, in a distributed ledger (such as those commonly used with blockchain technology), or the like.

Additional information used in the system can be in the form of agricultural data. the agricultural data can be categorized and/or separated into layers. For example, a first layer of the agricultural data can comprise planting information such as (a) an instruction to plant or not to plant; (b) seed and/or fertilizer type; (c) seed spacing; and (d) depth of planting. For example, a second layer of the agricultural data can comprise planting efficiency information such as (a) singulation (including skips and/or doubles); (b) fertilizer rates; and (c) population rates. For example, a third layer of the agricultural data can comprise time and/or weather forecast information such as (a) time of day; (b) air temperature; (c) season; and/or (d) a weather condition. For example, a fourth layer (not shown) of the agricultural data can comprise vehicle information such as (a) heading, such as a direction or bearing, of the implement and/or tow vehicle; (b) velocity or speed of the implement and/or tow vehicle; (c) fuel level of one or more fuel tanks on the implement and/or tow vehicle; and/or (d) technical capabilities of the implement and/or tow vehicle. For example, a fifth layer (not shown) of the agricultural data can comprise soil information such as (a) moisture content; (b) compaction; (c) ground temperature; (d) elevation; (e) depth; (f) slope of terrain; and/or (g) soil composition. Symbols and/or values for the agricultural data can be displayed via graphical user interface. The agricultural data can be designated as historical data, temporary data, live data, anticipated data, predictive data, or the like.

FIGS. 10A-10D show additional aspects and/or embodiments for supplementing, augmenting, or otherwise replacing GPS information for an agricultural machine. In the figures, an unmanned autonomous vehicle (UV) 300 is shown in conjunction with a tractor 100 and an implement 110, shown to be a planting implement. In the figures, the UV is shown to be an unmanned aerial vehicle (UAV). The UAV 300 may be a drone, such as a flying drone. As will be understood, the UAV can be tethered to the tractor 100, the implement 110, or both. The tethering of the UAV 300 to the machine(s) provides for information, and can be done in a wired or wireless manner. IN a wireless manner, the UAV 300 will transmit information to the machine(s) and vice versa, and the transmitted information can be used by all components to augment or otherwise supplement information, such as GPS information.

Also shown in the figures is a display 150 in the tractor 100, wherein the display is used to provide information related to the agricultural machine, including, but not limited to, operational information, agricultural information, speed, alerts/issues, help/troubleshooting, location, and the like. The display should not be limiting.

In FIG. 10A, the UAV 300 is shown to be flying a height (h1) 306 above the machines. The UAV can include rotors, propellers, thrusts, or the like to provide flying capabilities. In addition, the UAV can include sensors, transmitters, receivers, communication, processors, and other telemetry instruments. These are collectively shown by the sensor 304. As disclosed, the UAV 300 can be in communication with a GPS source 302, such as a satellite or other mechanism.

In the figure, the height 306 can be set above the machines such that the UAV 300 is able to have better connection to the GPS source 302. For example, some fields or other locations may be in areas, such as valleys or the like, in which there could be less than desired connection to a GPS source 302. The use of the UAV 300 at a height sufficient to receive the GPS information can be used to then transmit said GPS information 308 to the tractor and/or implement to be shown and used thereat, such as at the display 150 in the tractor 100. Thus, the use of the UAV 300 at such a height will supplement the GPS information used by the tractor 100 and/or implement 110. The known height of the UAV 300 will also be taken into account with the determination of the information.

Figure 10B:
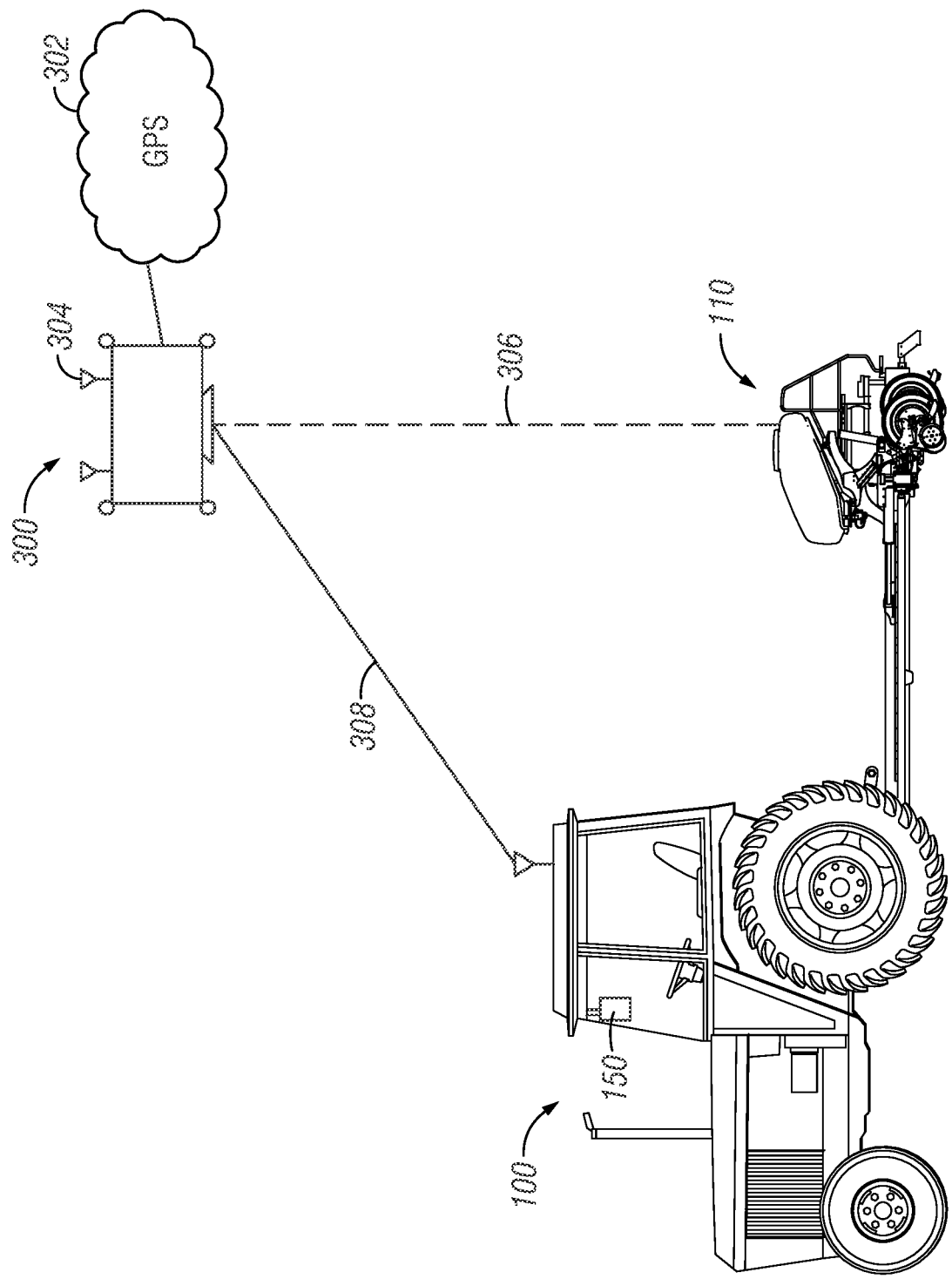
FIG. 10B is another view of the UAV and agricultural machine.

In FIG. 10B, the UAV 300 is positioned directly above the planter 110 at a known location relative thereto. The UAV 300 can receive direct GPS information from the GPS source 302, and the known elevation above the planter 110 can be used to transmit this information to the tractor 100 and/or planter 110 to augment or otherwise supplement the GPS information of the machines.

Figure 10C:
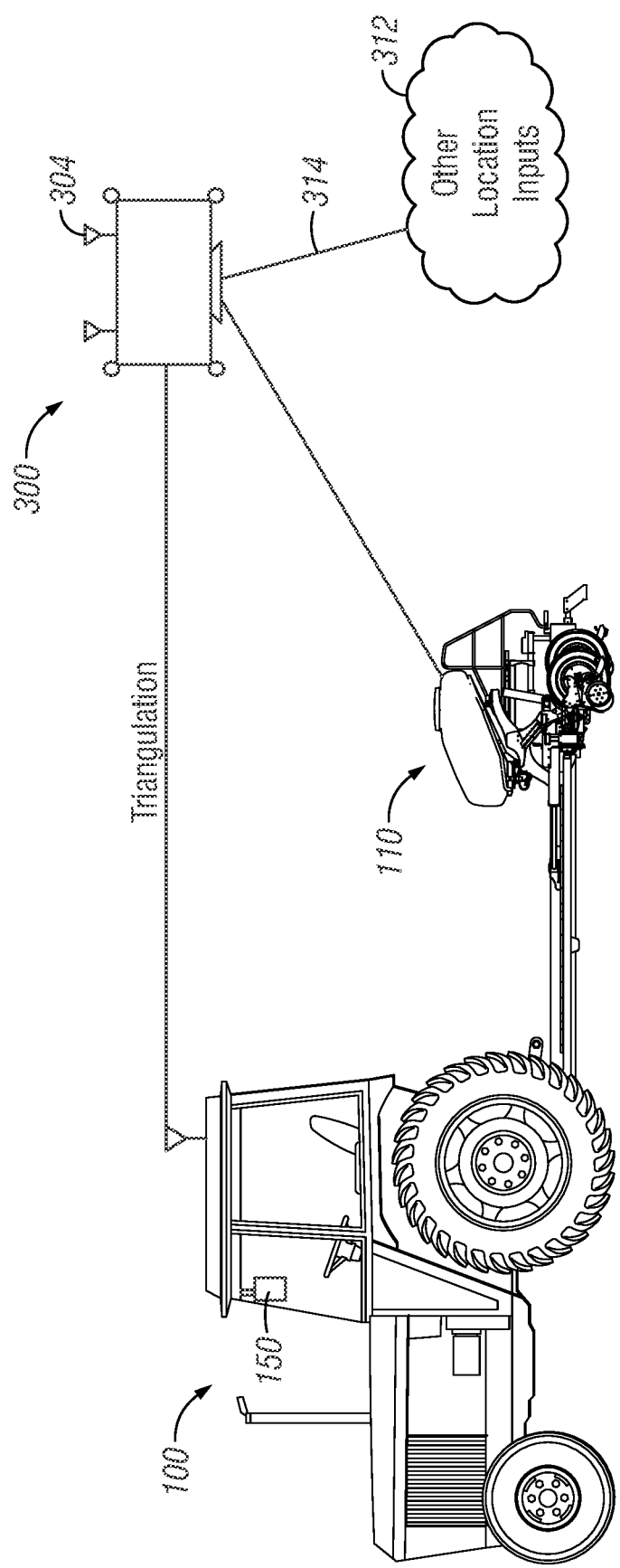
FIG. 10C is still another view of the UAV and the agricultural machine according to additional aspects of the system.

FIG. 10C is yet another example of how the UAV 300 could be used to augment or otherwise supplement the GPS information used by a tractor 100 and/or planter 110, such as at a display 150. In FIG. 10C, the location of the UAV 300 can be generally any location 312 relative to the tractor 100 and/or planter 110 such that the UAV 300 is able to acquire GPS information 314 from the source 302. The UAV 300 could also acquire information 314 via the use of IMUs on the planter, tractor, or UAV itself. The use of the IMUs to acquire additional information 314 will even further supplement the locational information of the machines. The acquired information 314 of the UAV 300 can then be triangulated 310 with the tractor 100 and/or planter 110 to supplement or replace GPS information used by the machines for one or more agricultural operations.

Figure 10D:
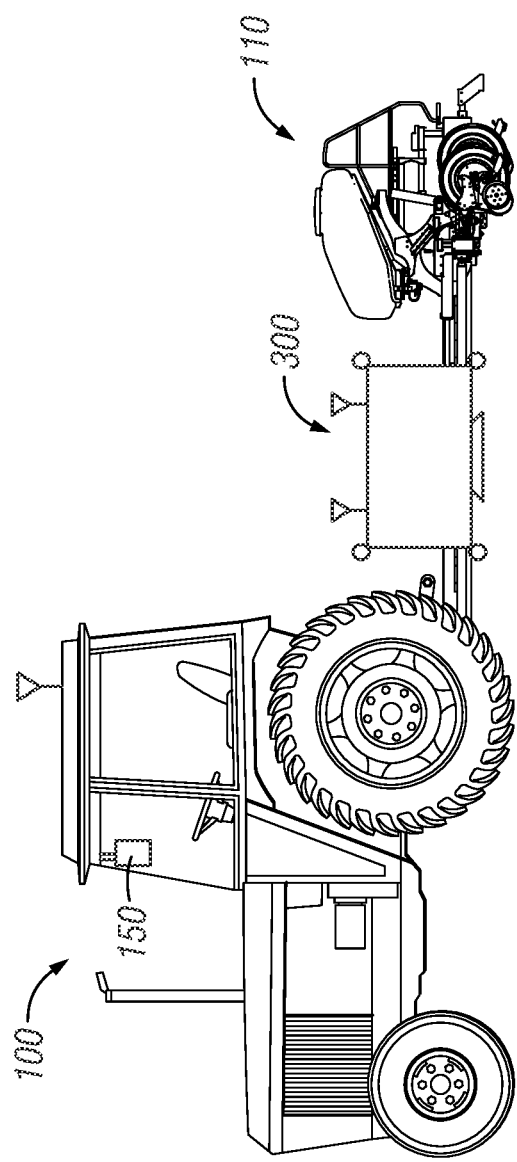
FIG. 10D is a view of the UAV and agricultural machine when the UAV is not in current use.

FIG. 10D shows that the UAV 300 can be a follow-on type drone that is only used when required. For example, the UAV 300 can be stored on the tractor 100 and/or planter 110, and can be sent an "activate" message when the GPS location information needs supplemented or replaced. The calling of the UAV 300 will send the UAV to one of the locations of FIGS. 10A-C in order to acquire the supplemental information in order to transmit the same to the machines in order to supplement the GPS location thereat.

Therefore, an assortment of data sources may be used to enhance the location data of an agricultural machine, such as a tractor (tow vehicle) or implement. Traditional forms in practice are tied into the GPS receiver itself where corrections are provided from base stations, cellular modems, etc. If these are not available or desired, there is a need for additional data sources.

An Inertial Measurement Unit (IMU) can be used in conjunction with GPS to provide absolute positioning, and with accumulated knowledge use IMU measurements to continue spatial tracking and operation until the GPS outage has concluded. Use of an additional speed and direction tracking source such as a wheel speed sensor enhances this capability and extends the amount of time for which it is valid.

Other sources can be pulled into additionally enhance accuracy and duration. Cameras onboard the tractor, Lidar sensors, and other motion sensors.

From the foregoing, it can be seen that the embodiments and/or aspects disclosed accomplish at least all of the stated objectives. The present disclosure is not to be limited to the particular embodiments described herein. In addition, it should be appreciated that any of the aspects disclosed relative to any of the embodiments shown and/or described could be combined with any of the other aspects and/or embodiments to provide even additional embodiments that those disclosed herein. Such additional embodiments would be obvious to those skilled in the art.

The invention claimed is:

1. An agricultural system, comprising:
   an agricultural implement configured to perform at least one agricultural operation in an area;
   an intelligent control system comprising:
   an intelligent implement router that provides identification information related to the agricultural implement including a type of implement and a number of components on the agricultural implement that are capable of performing the at least one agricultural operation;
   an intelligent implement node positioned at each of the components, wherein instructions for performing the agricultural operation are passed to the components through the intelligent node, and further wherein performance metrics about the agricultural operation are passed from the one or more components through the intelligent implement node to the intelligent implement router; and
   an intelligent implement positioner that (i) locates or (ii) tracks movement of, the components during the agricultural operation;
   a satellite-based radio navigation system associated with the agricultural implement to provide location information for the at least one agricultural operation in the area, wherein the location information relates to an event of the at least one agricultural operation, said location information being enhanced to include: a planting location for yield data, a location for prescription maps, and/or planted information to mitigate later compaction of a planted zone; and
   an augmentation system associated with the agricultural implement, wherein the augmentation system comprises an inertial measurement unit located on the agricultural machine, said inertial measurement unit having a 9-axis inertial measurement unit sensor to acquire supplemental information, and supplements the satellite-based radio navigation system or replaces the satellite-based radio navigation system during an outage of the satellite-based radio navigation system, said inertial measurement unit being capable of tethering the supplemental information to the location information from the satellite-based radio navigation system, said supplemental information including: a specific measurement of a body's force, an angular rate, and/or an orientation of the body.

2. The agricultural system of claim 1, wherein the augmentation system comprises a plurality of augmenting devices that include, at least, the inertial measurement unit.

3. The agricultural system of claim 2, wherein the plurality of augmenting devices comprise:
   a. one or more sensors,
   b. LIDAR,
   c. speedometers,
   d. direction devices,
   e. inertial measurement units,
   f. cameras,
   g. accelerometers,
   h. gyroscopes, and/or
   i. magnetometers.

4. The agricultural system of claim 1, further comprising an unmanned vehicle (UV) associated with the agricultural implement.

5. The agricultural system of claim 4, wherein the UV is part of the augmentation system.

6. The agricultural system of claim 4, wherein the UV is an unmanned aerial vehicle (UAV).

7. The agricultural system of claim 1, wherein the at least one agricultural operation comprises one or more of:
   a. planting;
   b. tilling;
   c. baling;
   d. harvesting;
   e. spraying;
   f. transporting; and
   g. cultivating.

8. The agricultural system of claim 7, wherein the event of the at least one agricultural operation comprises one or more of:
   a. planting a seed;
   b. spraying a location;
   c. harvesting a crop;
   d. driving at a location; and
   e. placement of a bale.

9. The agricultural system of claim 8, further comprising a communication system for communicating information with another agricultural implement.

10. The agricultural system of claim 9, further comprising a processor associated with the agricultural implement, wherein the processor instructs an operation or non-operation of the at least one agricultural operation.

11. The agricultural implement of claim 1, further comprising a display connected to the intelligent implement router showing at least one of GPS location information, combined GPS and GPS augmentation system location information, and GPS augmentation system location information.

12. A method of acquiring a location of an event of an agricultural operation performed by an agricultural machine, the method comprising:
   acquiring first location information communicated from a satellite in Earth's orbit with a satellite-based radio navigation system;
   acquiring second location information with an augmentation system comprising an inertial measurement unit located on the agricultural machine, said inertial measurement unit having a 9-axis inertial measurement unit sensor, said second location information including: a specific measurement of a body's force, an angular rate, and/or an orientation of the body, and wherein the augmentation system can tether the second location information to the first location information from the satellite-based radio navigation system;
   regardless of whether there is an outage of communication between the satellite-based radio navigation system and the satellite in Earth's orbit:
      continuously attempting to establish a connection to the satellite that is in Earth's orbit;
      accumulating the second location information so as to independently and spatially track the event;
   storing the location of the event in a memory with a date and time;
   enhancing the first location to include: a planting location for yield data, a location for prescription maps, and/or planted information to mitigate later compaction of a planted zone; and
   transmitting and receiving, as radio waves, aspects of the first and second location informations by:
      utilizing the first and second location informations from both the satellite-based radio navigation system and the augmentation system to provide the location of the event; or
      utilizing the second location information from the augmentation system when the satellite-based radio navigation system is not available to provide the location of the event.

13. The method of claim 12, further comprising displaying the location of the event on a user display.

14. The method of claim 13, wherein when the satellite-based radio navigation system is not available, displaying the location of the event based upon the augmentation system differently than the displayed location utilizing both the satellite-based radio navigation system and the augmentation system.

15. The method of claim 12, further comprising connecting an unmanned aerial vehicle to the agricultural machine to aid in acquiring the location of the event.

16. The method of claim 12, further comprising sharing the location of the event with a second agricultural machine, wherein a controller of the second agricultural machine uses the location of the event to control an operation of the second agricultural machine.

17. A system for location determination of an agricultural event performed by an agricultural machine, the system comprising:
   the agricultural machine comprising:
      a satellite-based radio navigation system used to acquire a location for enhancing and/or creating planting yield data or prescription maps, and/or for mitigating later compaction of a planted zone; and
      a augmentation system comprising an inertial measurement unit located on the agricultural machine, said inertial measurement unit having a 9-axis inertial measurement unit sensor used for acquiring a specific measurement of a body's force, an angular rate, and/or an orientation of the body, wherein the GPS augmentation system can tether the second location information to the first location information from the GPS;
   wherein the augmentation system further comprises an unmanned aerial vehicle (UAV) in communication with the agricultural machine, said UAV being a follow-on type drone that is stored on the agricultural machine until used to communicate its position to the agricultural machine to:
      supplement the location determined by the satellite-based radio navigation system; or
      be used in place of the satellite-based radio navigation system when acquisition of the location through the satellite-based radio navigation system is not available.

* * * * *